(12) United States Patent
Schlatter et al.

(10) Patent No.: US 9,282,507 B2
(45) Date of Patent: Mar. 8, 2016

(54) MANAGING WIRELESS CONNECTIONS BASED ON MOTION

(71) Applicant: QUALCOMM Incorporated, San Diego, CA (US)

(72) Inventors: Tobias Schlatter, San Diego, CA (US); Sha Hua, San Diego, CA (US); Arnaud Meylan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/961,078

(22) Filed: Aug. 7, 2013

(65) Prior Publication Data

US 2015/0045021 A1 Feb. 12, 2015

(51) Int. Cl.
*H04W 48/20* (2009.01)
*H04W 36/32* (2009.01)
*H04W 76/02* (2009.01)
*H04W 48/04* (2009.01)
*H04W 84/00* (2009.01)

(52) U.S. Cl.
CPC .............. *H04W 48/20* (2013.01); *H04W 36/32* (2013.01); *H04W 76/027* (2013.01); *H04W 48/04* (2013.01); *H04W 84/005* (2013.01)

(58) Field of Classification Search
CPC ... H04W 48/20; H04W 36/32; H04W 84/005; H04W 76/027; H04W 48/04
USPC ......... 455/411, 412.1, 414.1, 418, 434, 456.1
See application file for complete search history.

(56) References Cited

U.S. PATENT DOCUMENTS

| | | | |
|---|---|---|---|
| 7,581,005 B2 | 8/2009 | Montemayor et al. | |
| 8,254,928 B2 | 8/2012 | Watanabe et al. | |
| 2008/0107051 A1 | 5/2008 | Chen | |
| 2011/0211497 A1 | 9/2011 | Shiga et al. | |
| 2011/0275365 A1 | 11/2011 | Fischer et al. | |
| 2012/0172045 A1 | 7/2012 | Fukuta | |
| 2013/0090115 A1 | 4/2013 | Deivasigamani et al. | |
| 2014/0101737 A1* | 4/2014 | Rhee ................................ | 726/6 |

FOREIGN PATENT DOCUMENTS

| | | |
|---|---|---|
| EP | 1814270 A1 | 8/2007 |
| EP | 2424321 A1 | 2/2012 |
| WO | WO-2012134131 A2 | 10/2012 |
| WO | WO-2013025168 A1 | 2/2013 |

OTHER PUBLICATIONS

ISA/EPO, Partial International Search Report of the International Searching Authority, Int'l. App. No. PCT/US2014/048461, Nov. 6, 2014, European Patent Office, Rijswijk, NL, 5 pgs.

(Continued)

*Primary Examiner* — Sam Bhattacharya
(74) *Attorney, Agent, or Firm* — Holland & Hart LLP

(57) ABSTRACT

Methods, systems, and apparatuses are described for avoiding short-lived wireless connections. In one method, a first connection with a first access point may be used for data transmissions. A motion state of a mobile device may be determined based on sensor data from at least one sensor within the mobile device. A second access point may be identified. A determination may be made to use the second access point for data transmissions based at least in part on the motion state of the mobile device.

36 Claims, 18 Drawing Sheets

(56) References Cited

OTHER PUBLICATIONS

ISA/EPO, International Search Report and Written Opinion of the International Searching Authority, Int'l. App. No. PCT/US2014/048461, Feb. 3, 2015, European Patent Office, Rijswijk, NL, 19 pgs.

IPEA/EPO, Second Written Opinion of the International Preliminary Examining Authority, Int'l. App. No. PCT/US2014/048461, Aug. 5, 2015, European Patent Office, Munich, DE, 6 pgs.

* cited by examiner

MANAGING WIRELESS CONNECTIONS BASED ON MOTION

BACKGROUND

Wireless communications systems are widely deployed to provide various types of communication content, such as voice, video, packet data, messaging, broadcast, and so on. Wireless communications systems typically include macro cell access points for providing coverage to large areas. Small cell access points are increasingly being deployed in wireless communications systems to increase the capacity and/or improve the coverage of the wireless communications systems.

Small cell access points may provide coverage to a smaller area than macro cell access points. Accordingly, a mobile station may enter and exit the coverage of a small cell in a short amount of time. As a result, connections may be short-lived and reconnects may be frequent. In some cases, this may result in signaling storms for access points, interrupted connections for mobile stations, and/or higher power consumption for mobile stations.

SUMMARY

The described features generally relate to one or more improved methods, systems, and/or apparatuses for avoiding bad wireless connections.

In one configuration, a mobile station may use a first connection with a first access point for data transmissions. The mobile station may determine its motion state based on sensor data from at least one sensor within the mobile device. In a scan for available access points, a second access point may be identified. The second access point may be a small cell access point. The mobile station may determine to use the second access point based at least in part on the motion state of the mobile station.

In some embodiments, determining the motion state of the mobile device may include determining the motion state based on an acceleration of movement of the mobile device.

In some embodiments, determining the motion state of the mobile device may include determining the motion state based on an angular rotational velocity of the mobile device.

In some embodiments, a motion state of the second access point may be determined.

In some embodiments, determining whether to use the second access point for data transmissions may include determining whether to use the second access point based on the determined motion state of the mobile device and the determined motion state of the second access point.

In some embodiments, determining whether to use the second access point based on the determined motion state of the mobile device and the determined motion state of the second access point may include determining to use the second access point when the determined motion state of the mobile device and the motion state of the second access point are the same.

In some embodiments, determining whether to use the second access point based on the determined motion state of the mobile device and the determined motion state of the second access point may include determining to use the second access point when a relative difference between the determined motion state of the mobile device and the determined motion state is within a threshold.

In some embodiments, determining the motion state of the second access point may include learning the motion state of the second access point based at least in part on a previous connection with the second access point.

In some embodiments, determining the motion state of the second access point may include crowd sourcing information about the second access point. The information may include the motion state of the second access point.

In some embodiments, determining whether to use the second access point for data transmissions may include determining whether a back-off timer has been satisfied.

In some embodiments, a duration of the back-off timer may be adjusted based at least in part on a previous connection with the second access point.

In some embodiments, the duration of the back-off timer may be access point specific.

In some embodiments, determining whether to use the second access point may include determining whether to establish a connection with the second access point.

In some embodiments, determining whether to use the second access point may include determining whether to switch the data transmissions to an established connection with the second access point.

In some embodiments, the determined motion state may be associated with the identified second access point. Information about the identified second access point and its associated motion state may be stored.

In some embodiments, the first access point may be a macro cell access point and the second access point may be a small cell access point.

In some embodiments, the at least one sensor may include an accelerometer and/or a gyroscope.

An apparatus for managing data transmissions is also described. In one configuration, the apparatus may include a means for using a first connection with a first access point for data transmissions; a means for determining a motion state of a mobile device based on sensor data from at least one sensor within the mobile device; a means for identifying a second access point; and a means for determining whether to use the second access point for data transmissions based at least in part on the determined motion state of the mobile device.

Another apparatus for managing data transmissions is also described. The apparatus may include a processor, a memory in electronic communications with the processor, and instructions embodied in the memory. The instructions may be executable by the processor to use a first connection with a first access point for data transmissions; determine a motion state of a mobile device based on sensor data from at least one sensor within the mobile device; identify a second access point; and determine whether to use the second access point for data transmissions based at least in part on the determined motion state of the mobile device.

A computer program product for managing data transmissions is also described. The computer program product may include a non-transitory computer-readable medium storing instructions executable by a processor to use a first connection with a first access point for data transmissions; determine a motion state of a mobile device based on sensor data from at least one sensor within the mobile device; identify a second access point; and determine whether to use the second access point for data transmissions based at least in part on the determined motion state of the mobile device.

A method for managing connections is additionally described. In one configuration, a request for a connection may be received from a mobile device. A determination may be made at an access point as to whether the mobile device is blacklisted. The mobile device may be blacklisted when a number of previous connections associated with the mobile device exceeds a threshold. The request for the connection from the mobile device may be refused upon determining that the mobile device is blacklisted.

In some embodiments, a previous connection may include a connection having a duration that fails to satisfy a time threshold.

In some embodiments, a previous connection may include a connection that is disconnected due to the mobile device leaving a coverage area of the access point.

In some embodiments, the mobile device may be blacklisted when the number of previous connections within a time period exceeds a threshold.

In some embodiments, a connection with the mobile device may be established upon determining that the mobile device is not blacklisted.

In some embodiments, the mobile device may be identified. A duration of the connection with the mobile device may also be determined. The connection may be identified as a previous connection when the duration of the connection fails to satisfy a threshold. In some cases, a time of the previous connection may be identified. In some embodiments, the previous connection may be associated with the identified mobile device.

In some embodiments, the access point may be a small cell access point.

An apparatus for managing connections is also described. In one configuration, the apparatus may include a means for receiving a request for a connection from a mobile device; a means for determining, at an access point, whether the mobile device is blacklisted; and a means for refusing the request for the connection from the mobile device, upon determining that the mobile device is blacklisted. The mobile device may be blacklisted when a number of previous connections associated with the mobile device exceeds a threshold.

Another apparatus for managing connections is also described. The apparatus may include a processor, a memory in electronic communications with the processor, and instructions embodied in the memory. The instructions may be executable by the processor to receive a request for a connection from a mobile device; determine, at an access point, whether the mobile device is blacklisted; and refuse the request for the connection from the mobile device upon determining that the mobile device is blacklisted. The mobile device may be blacklisted when a number of previous connections associated with the mobile device exceeds a threshold.

A computer program product for managing connections is also described. The computer program product may include a non-transitory computer-readable medium storing instructions executable by a processor to receive a request for a connection from a mobile device; determine, at an access point, whether the mobile device is blacklisted; and refuse the request for the connection from the mobile device, upon determining that the mobile device is blacklisted. The mobile device may be blacklisted when a number of previous connections associated with the mobile device exceeds a threshold.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The following relates generally to switching between macro cell access points and small cell access points. In some cases, this may correspond to switching between cellular networks and Wi-Fi networks. Specifically, the following relates to avoiding bad wireless connections (e.g., short-lived connections).

Cellular operators are increasingly using Wi-Fi and other small cell technologies to expand network capacity and coverage. In general, usage of these smaller cells (e.g., Wi-Fi) is cheaper for operators and energy efficient for mobile devices. Accordingly, operators may configure mobile devices to automatically connect to available small cell access points (e.g., Wi-Fi access points) and switch from using the cellular connection for data transmission to using the small cell access points for data transmissions. However, a mobile device may only be within the coverage of a small cell access point for a short amount of time. For example, a mobile device may be in a car that drives by a stationary small cell access point. In another example, a mobile device may be stationary and a small cell access point on a bus may pass by the stationary mobile device. In these types of situations, the mobile device may connect to and switch over data transmissions to the small cell access point, only to have to reopen and revert back to the cellular connection when the mobile device is no longer within range of the small cell access point. These short-lived connections may result in a high number of reconnects with the cellular network (resulting in higher power consumption), signaling storms for access points, and interrupted connections for applications (e.g., interruptions to the user experience).

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
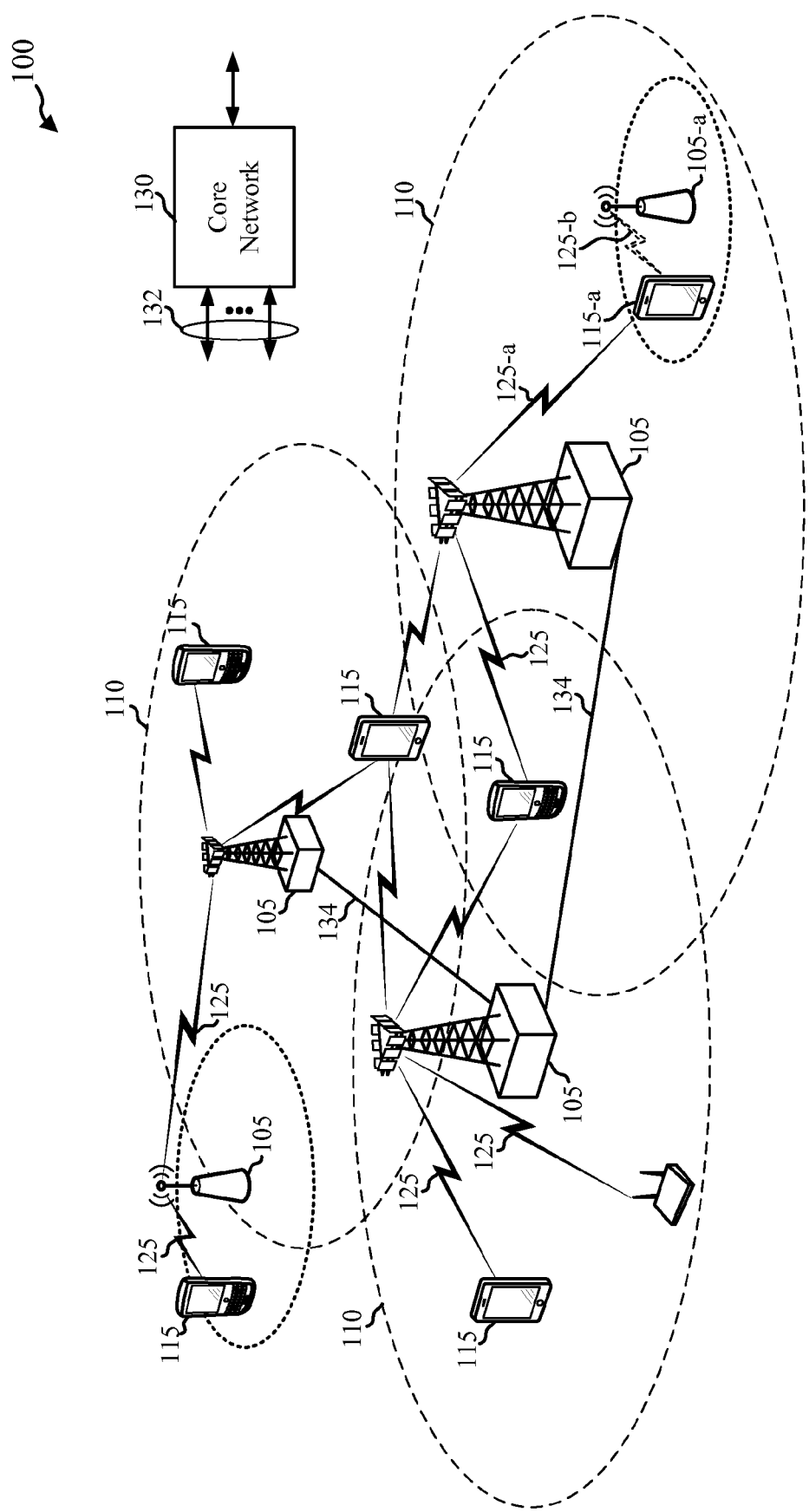
FIG. 1 shows a block diagram of a wireless communications system.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, femto, and/or pico base stations). Micro, femto, and pico base stations may be examples of small cells. There may be overlapping coverage areas for different technologies. For example, small cell 105-a may be a Wi-Fi base station within the coverage area of an LTE/LTE-A base station.

In some embodiments, the system 100 is an LTE/LTE-A network. In LTE/LTE-A networks, the terms evolved Node B (eNB) and user equipment (UE) may be generally used to describe the base stations 105 and devices 115, respectively. As used herein, a base station 105 is generally referred to as an access points (AP) and a device 115 is generally referred to as a mobile station (MS). The system 100 may be a Heterogeneous LTE/LTE-A network in which different types of APs provide coverage for various geographical regions. For example, each AP 105 may provide communication coverage for a macro cell, a pico cell, a femto cell, and/or other types of cell. A macro cell generally covers a relatively large geographic area (e.g., several kilometers in radius) and may allow unrestricted access by MSs with service subscriptions with the network provider. A pico cell would generally cover a relatively smaller geographic area and may allow unrestricted access by MSs with service subscriptions with the network provider. A femto cell would also generally cover a relatively small geographic area (e.g., a home) and, in addition to unrestricted access, may also provide restricted access by MSs having an association with the femto cell (e.g., MSs in a closed subscriber group (CSG), MSs for users in the home, and the like). An AP for a macro cell may be referred to as a macro AP. An AP for a pico cell may be referred to as a pico AP. And, an AP for a femto cell may be referred to as a femto AP or a home AP. An AP may support one or multiple (e.g., two, three, four, and the like) cells.

The core network 130 may communicate with the APs 105 via a backhaul 132 (e.g., S1, etc.). The APs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

The MSs 115 are dispersed throughout the wireless network 100, and each MS may be stationary or mobile. A MS 115 may also be referred to by those skilled in the art as a user equipment, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The MS 115 may be a cellular phone, a personal digital assistant (PDA), a wireless modem, a wireless communication device, a handheld device, a tablet computer, a laptop computer, a cordless phone, a wireless local loop (WLL) station, or the like. A MS may be able to communicate with macro eNBs, pico eNBs, femto eNBs, relays, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

In some embodiments, an MS 115-*a* may be within the coverage areas of multiple APs. For example, MS 115-*a* may be in the coverage area of an LTE/LTE-A access point 105 and the coverage area of a small cell Wi-Fi access point 105-*a*. In some cases, it may be beneficial for an MS to use a small cell access point 105-*a* (e.g., Wi-Fi access point) rather than using a macro cell 105 (e.g., LTE/LTE-A access point). For example, small cells may allow for efficient resource use (e.g., reduced power consumption for users, enhanced spectral efficiency, etc.) by bringing the network closer to users. Often, small cells are used to increase the capacity of a network. For example, capacity may be increased by offloading traffic (e.g., data traffic) from macro cells to small cells where available. This may be particularly beneficial in urban environments where small cells may provide better coverage and/or increased bandwidth than macro cells.

However, offloading traffic from macro cells to small cells may not always be beneficial. For example, since the coverage area of a small cell is typically small, an MS 115-*a* that is in motion may enter the coverage area of the small cell access point 105-*a* only to leave the coverage area of the small cell access point 105-*a* a short time later. Without the systems and methods described herein, an MS 115-*a* that is connected to a macro cell 105 (e.g., via a first transmission link 125-*a*) and driving by a stationary small cell 105-*a* may connect to and attempt to use a second transmission link 125-*b* for traffic, only to leave the coverage area of the small cell 105-*a* a short time later and have to switch back to using the first transmission link 125-*a* for traffic. As a result, considerable resources may be expended for little or no benefit to the MS 115-*a*. In addition to consuming unnecessary resources, making a bad connection (e.g., a connection with a duration that is less than a threshold) may disrupt the traffic flow (disrupting the user experience, for example).

In some embodiments, the MS 115-*a* may determine its motion state and determine whether to use the small cell 105-*a* based on the motion state of the MS 115-*a*. For example, if the MS 115-*a* determines that it is moving quickly (e.g., driving), the MS 115-*a* may determine to avoid using the small cell 105-*a* or delay from using the small cell 105-*a* until it has been determined that it is likely that the connection (e.g., transmission link 125-*b*) with the small cell 105-*a* will be a good connection (e.g., a connection with a duration that is more than a threshold). As used herein, a connection may include association, authentication, and allocation of a network address.

In some cases, the MS 115-*a* may determine whether to connect to an access point (e.g., small cell access point) based on the motion state (e.g., stationary, walking, driving) of the MS 115-*a* relative to the motion state (e.g., stationary, moving) of the access point. In other cases (e.g., cases where the MS 115-*a* automatically connects to an available small cell access point), the MS 115-*a* may determine whether to use the connection with the small cell access point for data transmissions based on the motion state of the MS 115-*a* relative to the motion state of the small cell access point. In the case that the motion state of the MS 115-*a* is stationary and the motion state of the small cell access point is stationary, then the MS 115-*a* may switch over and use the connection with the small cell access point for data transmissions. However, if the MS 115-*a* is moving and the small cell access point is stationary, then the MS 115-*a* may not use the connection with the small cell access point to transmit/receive data traffic. Instead, the MS 115-*a* may continue using the connection with the cellular access point for data transmissions. Thus, the MS 115-*a* may avoid establishing and using bad wireless connections (e.g., short-lived connections). In some cases, such mechanisms may be used to enhance the connection control, so that short lived connections are eliminated at a lower layer. Avoiding bad connections may remove the signaling load faced by the access points which may be desirable to the operator of the network.

The MS 115-*a* may use a variety of sensors (e.g., accelerometers, gyroscopes, compass, etc.) to determine the motion state of the MS 115-*a*. In some cases, sensor data may be evaluated over one or more time periods to identify the motion state (e.g., stationary, walking, driving, etc.) associated with the sensor data. In some cases, the motion state may be determined based on the sensed acceleration of movement and/or angular rotational velocity of the MS 115-*a*.

In some cases, the MS 115-*a* may learn the motion state of an access point (e.g., small cell access point) based on the duration of a connection with the access point. If the connection duration is greater than a threshold (e.g., 60 seconds), then the motion state of the access point may be classified to be the same as the motion state of the MS 115-*a*. However, if the connection duration is shorter than a threshold, then the motion state of the access point may be determined based on the motion state of the MS 115-*a* For example, if the MS 115-*a* is stationary, and the connection is lost, then the access point may be determined to be mobile (motion state of access point=mobile). If the MS 115-*a* moves, then the motion state of the access point may be unknown. In some cases, the motion state of the access point may be obtained based on crowd sourced information or may be indicated by the access point.

In some cases, an MS 115-*a* may immediately determine whether to connect to and/or use an access point for data transmissions. In other cases, an MS 115-*a* may wait until the expiration of a back-off timer before determining whether to connect to and/or use an access point for data transmissions. This may be particularly beneficial when an MS 115-*a* that has a motion state of driving becomes stationary (e.g., stopped at a red light) for a period of time. In some cases, the mobile device may quickly move away (e.g., the light turns green, drives away) from a stationary access point. In these situations (a leave situation), the motion state of the MS 115-*a* may remain as driving. In some cases, the MS 115-*a* may learn to set the back-off timer to a value that exceeds the typical stationary time before the leave. This may allow for the MS 115-*a* to avoid using the connection until there is a greater probability that the connection with the access point will be a good connection (e.g., a connection that last longer than 60 seconds, for example). In other cases, the MS 115-*a* may remain stationary (switch to a stationary motion state, for example) or may transition to using walking movements (switch to walking motion state, for example). In which case, the MS 115-*a* may, upon expiration of the back-off timer, analyze the motion state of the MS 115-*a* with respect to the motion state of the access point and determine whether to connect to the stationary access point. For example, upon expiration of the back-off timer, the MS 115-*a* may determine that the motion state of the MS 115-*a* and the motion state of the access point are the same. In another example, upon expiration of the back-off timer, the MS 115-*a* may determine that the relative difference between the motion state of the MS 115-*a* and the motion state of the access point is within a threshold.

Since there are varying degrees and circumstances of motion, the determination of whether to connect to and use a connection with a small cell access point (e.g., Wi-Fi access point) for data transmissions may be based on certain combinations of the motion state of the MS 115-*a* and the motion state of the access point. For example, if the MS 115-*a* is in the motion state of walking and will likely be in the coverage of a stationary access point for a sufficient duration, then the MS 115-*a* may determine to use the connection with the small cell access point for data transmissions. However, if the MS 115-*a* is in a more accelerated motion state, and the access point is stationary, then the MS 115-*a* may determine to ignore (not use) the connection with the small cell access point for data transmissions or not connect with it. The MS 115-*a* associates a motion state with each unique access point, as can be defined by the WLAN MAC address, or a ECGI (E-UTRAN Cell Global Identifier).

In some embodiments, the small cell 105-*a* may avoid bad connections by identifying the MSs 115-*a* that attempt to connect to the small cell 105-*a* and determining the number of bad connections associated with the identified MSs 115-*a*. The small cell 105-*a* may blacklist MSs 115-*a* with a number of bad connections that exceed a threshold. In some cases, the threshold may be static (e.g., a number of bad connections within a given time period). In other cases, the threshold may be dynamic (e.g., relative number of connections with other APs, the top percentage of MSs associated with the highest number of bad connections, etc.). These blacklisted MSs 115-*a* may be blocked from connecting with the small cell 105-*a*. For example, although the MS 115-*a* is in the coverage area of the small cell 105-*a* and sends a request to connect, if the MS 115-*a* is blacklisted on the small cell 105-*a*, the small cell 105-*a* may refuse the request to connect and may block the MS 115-*a* from connecting with the small cell 105-*a*. In some cases, blacklisting MSs 115-*a* that are associated with a number of bad connections that exceed a threshold may prevent signaling storms (e.g., short-lived connections with high numbers of reconnects) at the small cell 105-*a*.

Figure 2:
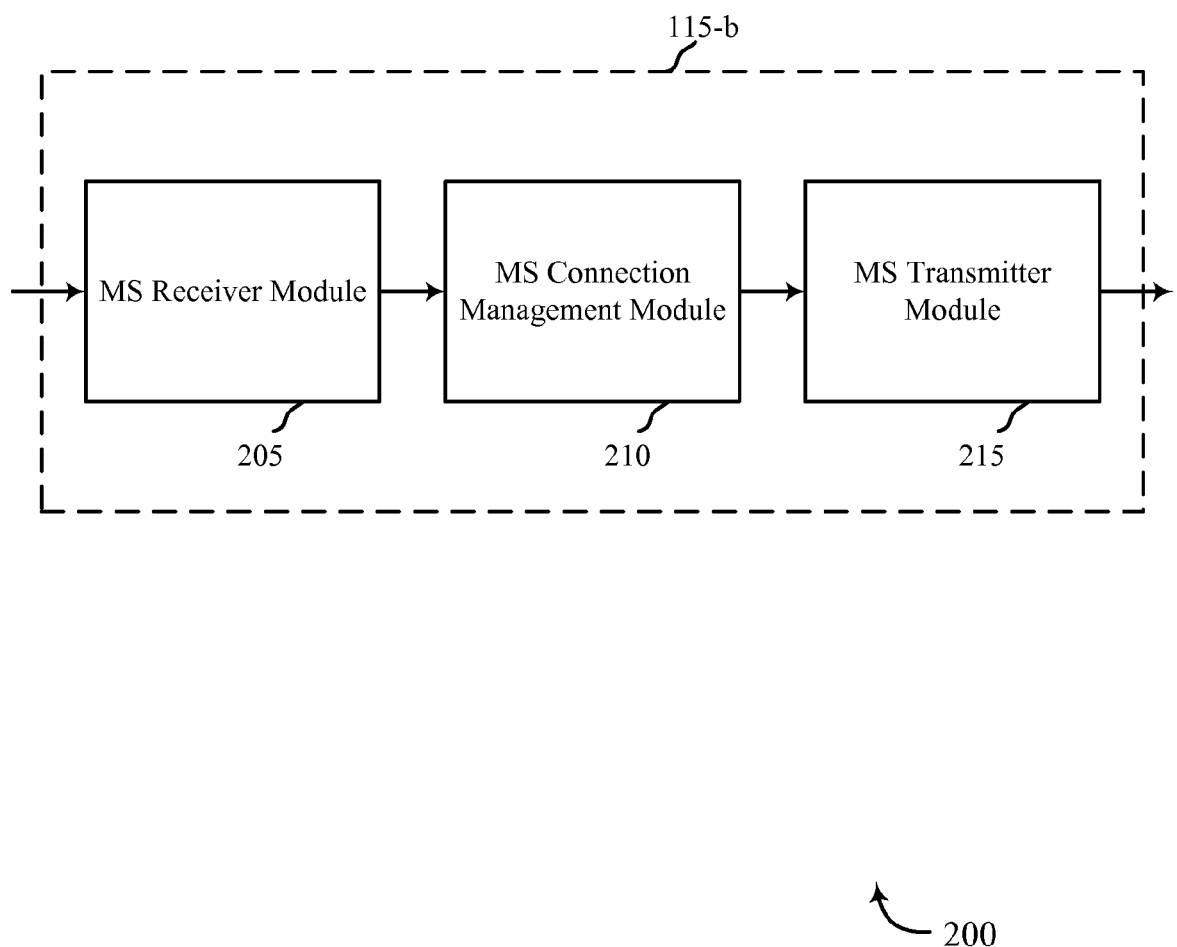
FIG. 2 shows a block diagram of a mobile station capable of managing the routing of data transmissions in accordance with various embodiments.

Referring now to FIG. 2, a block diagram 200 illustrates an MS 115-*b* capable of managing the routing of data transmissions, in accordance with various embodiments. The MS 115-*b* may be an example of one or more aspects of one of the MSs 115 described with reference to FIG. 1. The MS 115-*b* may also be a processor. The MS 115-*b* may include an MS receiver module 205, an MS connection management module 210, and/or an MS transmitter module 215. Each of these components may be in communication with each other.

The components of the MS 115-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The MS receiver module 205 may include any number or types of receivers, and in some cases may include two or more wireless receivers, such as a cellular receiver and a wireless local area network (WLAN) receiver. In some cases, the cellular receiver may be or include an LTE/LTE-A receiver. The MS receiver module 205 may be used to receive various types of data and/or control signals (i.e., transmissions) over one or more communication channels of a wireless communications system, such as the wireless communications system 100 described with reference to FIG. 1.

The MS transmitter module 215 may include any number or types of transmitters, and in some cases may include two or more wireless transmitters, such as a cellular transmitter and a WLAN transmitter. In some cases, the cellular transmitter may be or include an LTE/LTE-A transmitter. The MS transmitter module 215 may be used to transmit various types of data and/or control signals over one or more communication channels of a wireless communications system, such as the wireless communications system 100.

The MS connection management module 210 may perform various functions. In some embodiments, the MS connection management module 210 may manage the connections that are made via the MS receiver module 205 and the MS transmitter module 215. For example, the MS connection management module 210 may determine whether to connect to an access point based on the motion state of the MS 115-*b*. In another example (e.g., in the case that the MS 115-*b* automatically connects to available access points), the MS connection management module 210 may determine whether to switch traffic from using a first connection with a first access point to using a second connection with the second access point based on the motion state of the MS 115-*b*. If the MS connection management module 210 determines to not use the second access point, the MS 115-*b* may continue to use the first connection with the first access point for data transmissions.

In some embodiments, the MS connection management module 210 may use a first connection with a first access point for data transmissions. The MS connection management module 210 may determine and/or monitor the motion state of the MS 115-*b*. Upon detecting a second access point, the MS connection management module 210 may identify the motion state of the second access point. The MS connection management module 210 may determine whether to use the second access point for data transmissions based on the motion state of the MS 115-*b* with respect to the motion state of the second access point. In one example, the determination may be based on a difference between the motion state of the MS 115-*b* and the motion state of the second access point being under a threshold. In one embodiment, the first access point may be a macro cell (e.g., LTE/LTE-A access point) and the second access point may be a small cell (e.g., Wi-Fi access point).

Figure 3:
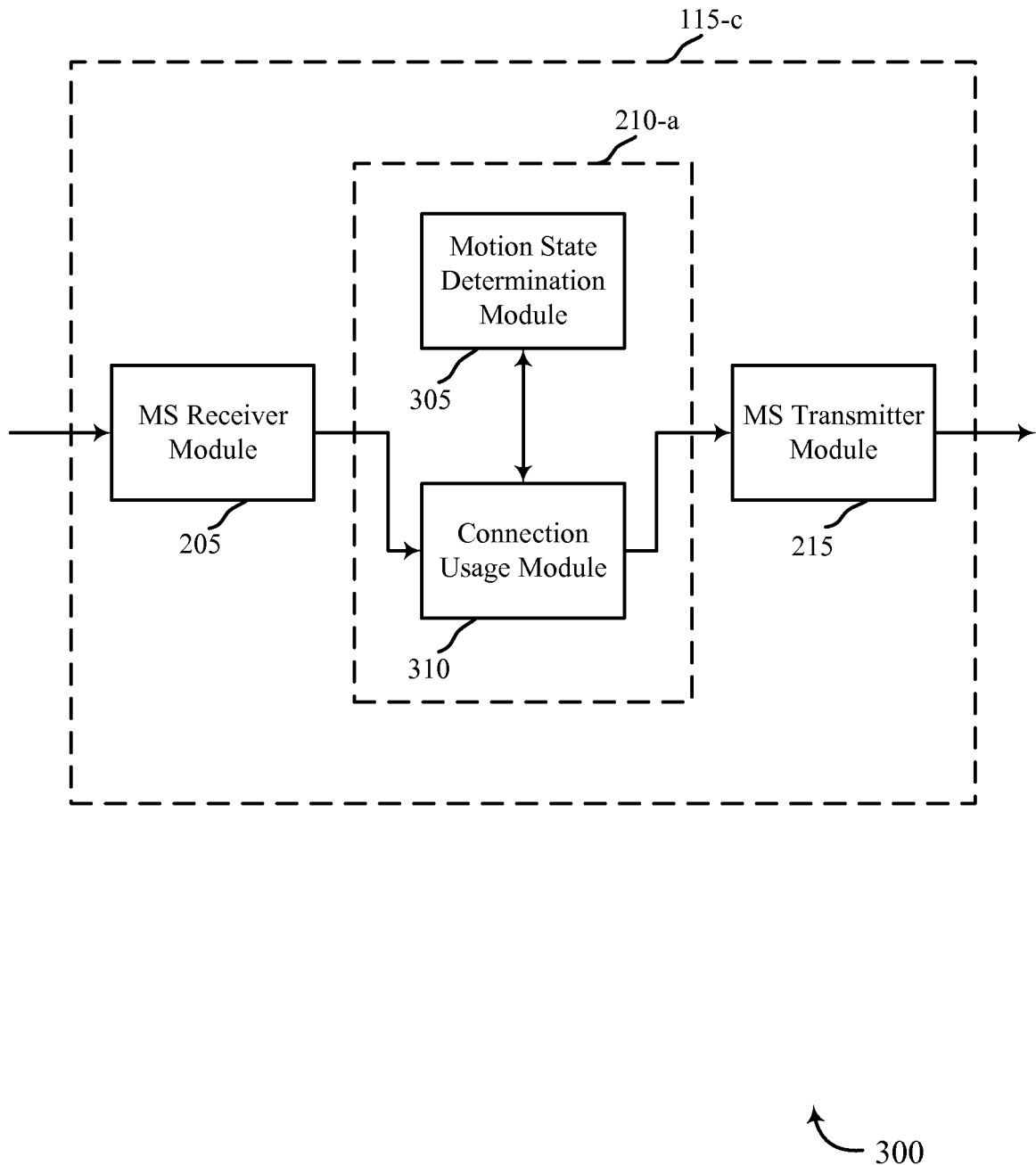
FIG. 3 shows a block diagram of another mobile station capable of managing the routing of data transmissions in accordance with various embodiments.

Referring now to FIG. 3, a block diagram 300 illustrates an MS 115-*c* capable of managing the routing of data transmissions, in accordance with various embodiments. The MS 115-*c* may be an example of one or more aspects of one of the MSs 115 described with reference to FIG. 1. The MS 115-*c* may also be a processor. The MS 115-*c* may include an MS receiver module 205, an MS connection management module 210-*a*, and/or an MS transmitter module 215. Each of these components may be in communication with each other.

The components of the MS 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The MS receiver module 205 and MS transmitter module 215 may be configured similarly to what is described with respect to FIG. 2. The MS connection management module 210-a may be an example of one or more aspects of the MS connection management module 210 described with reference to FIG. 2 and may include a motion state determination module 305 and/or a connection usage module 310.

The motion state determination module 305 may monitor the motion of the MS 115-c and determine a motion state for the MS 115-c. In some cases, the motion state determination module 305 may determine the motion state of the MS 115-c based on sensor data from one or more sensors (e.g., accelerometers, compasses, gyroscopes, magnetometers, global positioning systems, triangulation systems, etc.). For example, the motion state determination module 305 may determine a walking motion state based on the acceleration of movement and/or angular rotational velocity measurements associated with walking. In another example, the motion state determination module 305 may determine a driving motion state based on the acceleration of movement and/or angular rotational velocity measurements associated with driving. In some embodiments, the one or more sensors may be included in the MS 115-c.

The motion state determination module 305 may monitor the motion of the MS 115-c by periodically or continuously analyzing sensor data and determining the motion state based on the analysis of the sensor data. In one example, the motion state determination module 305 may determine whether the MS 115-c is stationary or moving. In some cases, the motion state determination module 305 may distinguish between various types of motion (e.g., walking, running, driving, etc.). For instance, the motion state determination module 305 may analyze sensor data over a period of time and may determine the motion state based on, for example, the level of motion, the percentage of a time period doing that level of motion, the location of the motion, the trend of motion over the time period, a predicted motion based on recent motion or previous history of motion, etc. For instance, the motion state determination module 305 may determine that the MS 115-c had previously been in motion, but is currently stationary. As an example, a user of the MS 115-c may have been driving or riding in a vehicle. The MS 115-c may now be stationary (e.g., stopped at a traffic light). However, the MS 115-c will transition back to a motion state when the traffic light changes to green. In some cases, the motion state determination module 305 may keep a history or log of motion types associated with various locations and predict future motion states of the MS 115-c based on the history or log.

In some embodiments, the motion state determination module 305 may identify the motion state of an access point. For example, the motion state determination module 305 may determine whether an access point is stationary or mobile. In one example, the motion state determination module 305 may determine the motion state of an access point based on a previous connection with the access point and the motion state of the MS 115-c during that previous connection. In another example, the motion state determination module 305 may determine the motion state of an access point based on obtained information (e.g., crowd sourced information, compiled database, etc.).

The connection usage module 310 may determine whether to use a connection for data transmissions based on the motion states determined by the motion state determination module 305. In some embodiments, the connection usage module 310 may interact with the MS receiver module 205 and the MS transmitter module 215 to make a connection with an access point and/or switch traffic (e.g., data transmissions) to a connection. In some cases, the connection usage module 310 may maintain multiple connections while using only one or a subset of the multiple connections for traffic. In other cases, the connection usage module 310 may effect a handoff between a first connection with a first access point and a second connection with a second access point (dropping the first connection upon a successful handoff of traffic to the second access point.

Figure 4:
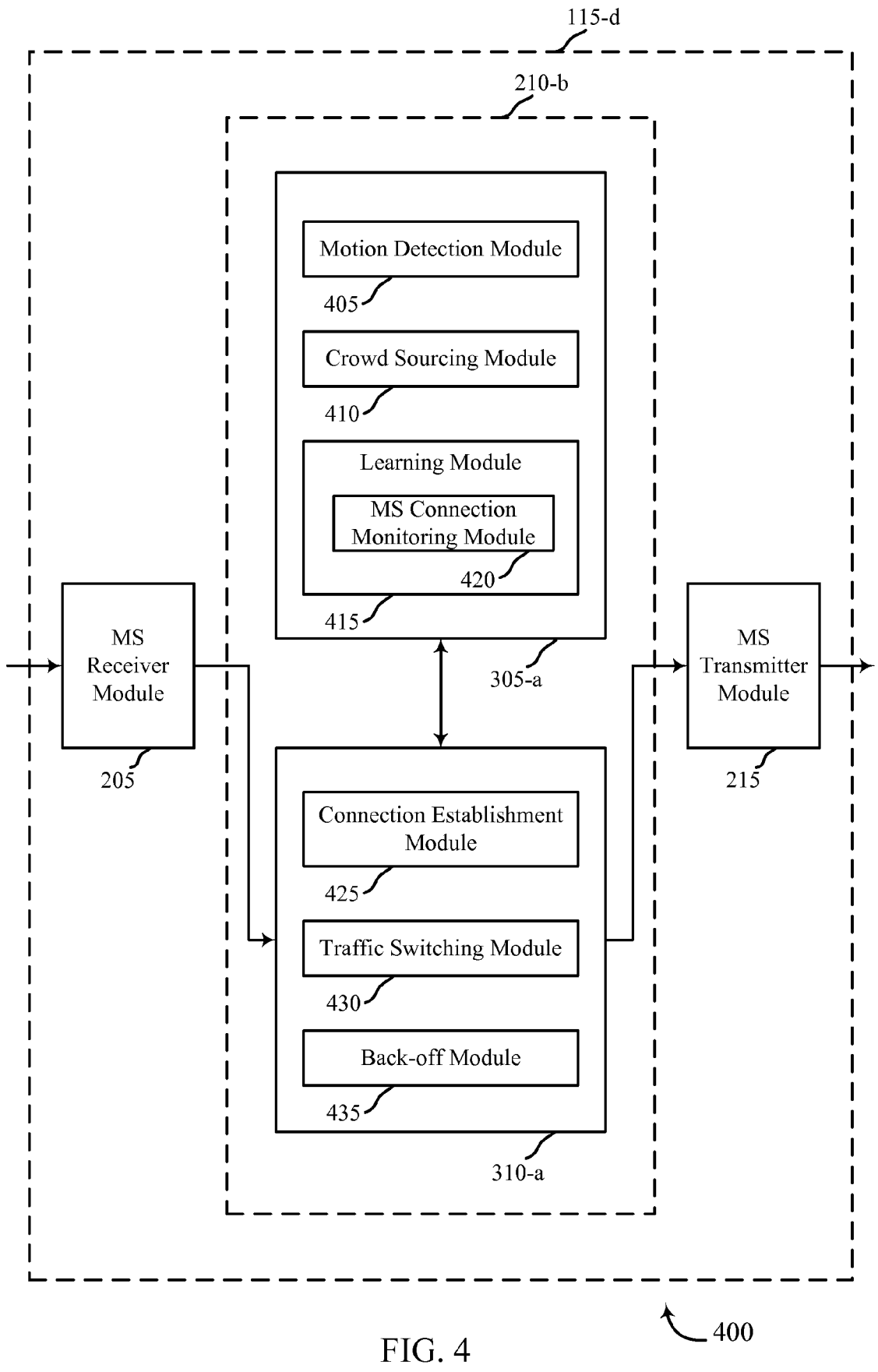
FIG. 4 shows a block diagram of yet another mobile station capable of managing the routing of data transmissions in accordance with various embodiments.

Referring now to FIG. 4, a block diagram 400 illustrates an MS 115-d capable of managing the routing of data transmissions, in accordance with various embodiments. The MS 115-d may be an example of one or more aspects of one of the MSs 115 described with reference to FIGS. 1, 2, and/or 3. The MS 115-d may also be a processor. The MS 115-d may include an MS receiver module 205, an MS connection management module 210-b, and/or an MS transmitter module 215. Each of these components may be in communication with each other.

The components of the MS 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The MS receiver module 205 and MS transmitter module 215 may be configured similarly to what is described with respect to FIGS. 2 and/or 3. The MS connection management module 210-b may be an example of one or more aspects of the MS connection management modules 210 described with reference to FIGS. 2 and/or 3 and may include a motion state determination module 305-a and/or a connection usage module 310-a. The motion state determination module 305-a and connection usage module 310-a may be examples of one or more aspects of the respective motion state determination module 305 and connection usage module 310 described with reference to FIG. 3.

The motion state determination module 305-a may determine the motion state of the MS 115-d. In some cases, the motion state determination module 305-a may determine the motion state of an AP. In this regard, the motion state determination module 305-a may include a motion detection sub module 405, a crowd sourcing sub module 410, and/or a learning sub module 415.

The motion detection sub module 405 may obtain sensor data from one or more sensors, and may determine the motion state of the MS 115-d based on the sensor data. In various embodiments, the motion detection sub module 405 may analyze the sensor data to determine the motion state of the MS 115-d. In some cases, the motion detection sub module 405 may determine the motion state of the MS 115-d based on a single instance of time. For example, the motion detection sub module 405 may obtain sensor data for a single instance of time and may determine the motion state of the MS 115-d by analyzing the sensor data at that singe instance of time. In other cases, the motion detection sub module 405 may determine the motion state of the MS 115-d based on a period of time. For example, the motion detection sub module 405 may monitor the sensor data over a period of time and may analyze the sensor data over that period of time. In one example, the motion detection sub module 405 may average the sensor data over the period of time. In another example, the motion detection sub module 405 may analyze the percentage of different types of instantaneous motion states over the period of time. In some cases, the motion detection sub module 405 may select the time period for determining the motion state of the MS 115-*d* based on recent motion state information, the location of the MS 115-*d*, and/or learned behavior patterns.

The crowd sourcing sub module 410 may obtain the motion state of an access point based on crowd sourced information about the base station. In some cases, the crowd sourcing sub module 410 may receive communications from one or more nearby MSs that indicate the motion state of an AP. For example, the MS 115-*d* may receive crowd sourced information about an AP, including motion state information about the AP (when the MS 115-*d* nears the AP, for example). In other cases, the crowd sourcing sub module 410 may obtain the motion state of an AP based on a database (hosted on a server, for example) that is updated via crowd sourcing information.

The learning sub module 415 may learn the motion state of an AP by monitoring a connection with the AP and by monitoring the motion state of the MS 115-*d* (via motion detection sub module 405, for example). For example, the learning sub module 415 may learn the motion state of an AP by analyzing the strength of the connection with the AP with respect to the motion state of the MS 115-*d*. Accordingly, the learning sub module 415 may include a connection monitoring sub module 420. The connection monitoring sub module 420 may monitor the connection with an AP. For example, the connection monitoring sub module 420 may monitor the signal strength between the AP and the MS 115-*d* and may monitor whether the connection has been disconnected. Additionally, the connection monitoring sub module 420 may monitor the duration of the connection with an AP.

In one example, the learning sub module 420 may determine whether the connection between the MS 115-*d* and the AP is a good connection based upon the duration of the connection with the AP. If the duration of the connection is greater than a threshold (e.g., 60 seconds), then the motion state of the AP is determined to be the same as the motion state of the MS 115-*d*. If the duration of the connection is less than the threshold, then the motion state of the AP may be determined based on the motion state of the MS 115-*d* when the connection with the AP was disconnected. For example, if the motion state of the MS 115-*d* is stationary and the connection is disconnected, then the motion state of the AP may be determined to be mobile. If the connection is established when both the MS 115-*d* is stationary (stopped at a traffic light, for example), but the connection is lost when the MS 115-*d* moves (leaves the traffic light and continues driving, for example), then the motion state of the AP may be determined to be stationary. In this example, the learning sub module 420 may learn the time that the MS 115-*d* is typically in the stationary motion state before moving and may set a back-off timer for the learned time to avoid making a bad connection.

The connection usage module 310-*a* may determine whether to use a connection based on the motion state of the MS 115-*d* and/or the motion state of an AP. To use a connection, the connection usage module 310-*a* may connect to an access point and/or switch traffic so that data traffic uses the connection with an access point. In this regard, the connection usage module 310-*a* may include a connection establishment sub module 425, a traffic switching sub module 430, and/or a back-off sub module 435.

The connection establishment sub module 425 may establish a connection with one or more APs. In some cases, the connection establishment sub module 425 may determine to connect to an AP. For example, the connection establishment sub module 425 may determine to connect to an AP based on the motion state of the MS 115-*d* and/or the motion state of the AP. In other cases, the connection establishment module 425 may automatically connect to an AP when the MS 115-*d* is within the coverage area of the AP. In either case, the connection establishment sub module 425 may establish a connection that may be used for data traffic. In one example, the connection establishment sub module 425 may establish a connection with a first connection with a first access point (e.g., a macro cell access point). Upon entering the coverage area of a second access point (e.g., a small cell access point), the connection establishment sub module 425 may automatically connect or determine to connect to the second access point based on the motion state of the MS 115-*d* and/or the motion state of the second AP.

The traffic switching sub module 430 may switch traffic (e.g., data traffic) from a first connection to a second connection based on the motion state of the MS 115-*d* and/or the motion state of the AP. In the cases where the connection establishment sub module 425 automatically connects to the second AP, the traffic switching sub module 430 may not immediately switch traffic to the connection with the second AP. Instead the traffic switching sub module 430 may determine to switch traffic to the connection with the second AP based on the motion state of the MS 115-*d* and/or the motion state of the second AP. In the cases where the connection establishment sub module 425 determines to connect to the second AP based on the motion state of the MS 115-*d* and/or the motion state of the second AP, the traffic switching sub module 430 may automatically switch traffic to the connection with the second AP.

The back-off sub module 435 may delay the connection establishment sub module 425 from connecting with a second AP and/or delay the traffic switching sub module 430 from switching traffic to the second AP until after the expiration of a back-off timer. In some cases, the connection usage module 310-*a* may re-compare the motion state of the MS 115-*d* and the motion state of the AP after the back-off timer has expired and may determine whether to connect and/or use the connection based on the updated comparison. In some cases, the duration of the back-off timer may be learned by the learning sub module 415. The back-off sub module may delay the usage of an AP to improve the likelihood that the connection with the AP may be a beneficial connection. For example, in the case where the user of an MS 115-*d* is driving or riding in a car but is stationary at a traffic light, the back-off timer may delay the MS 115-*d* from using the second connection until after the time that the MS 115-*d* would have left the coverage area of the access point. In some cases, the back-off sub module 435 may learn the duration of the back-off time for a particular access point based on at least one previous connection with the access point.

Figure 5:
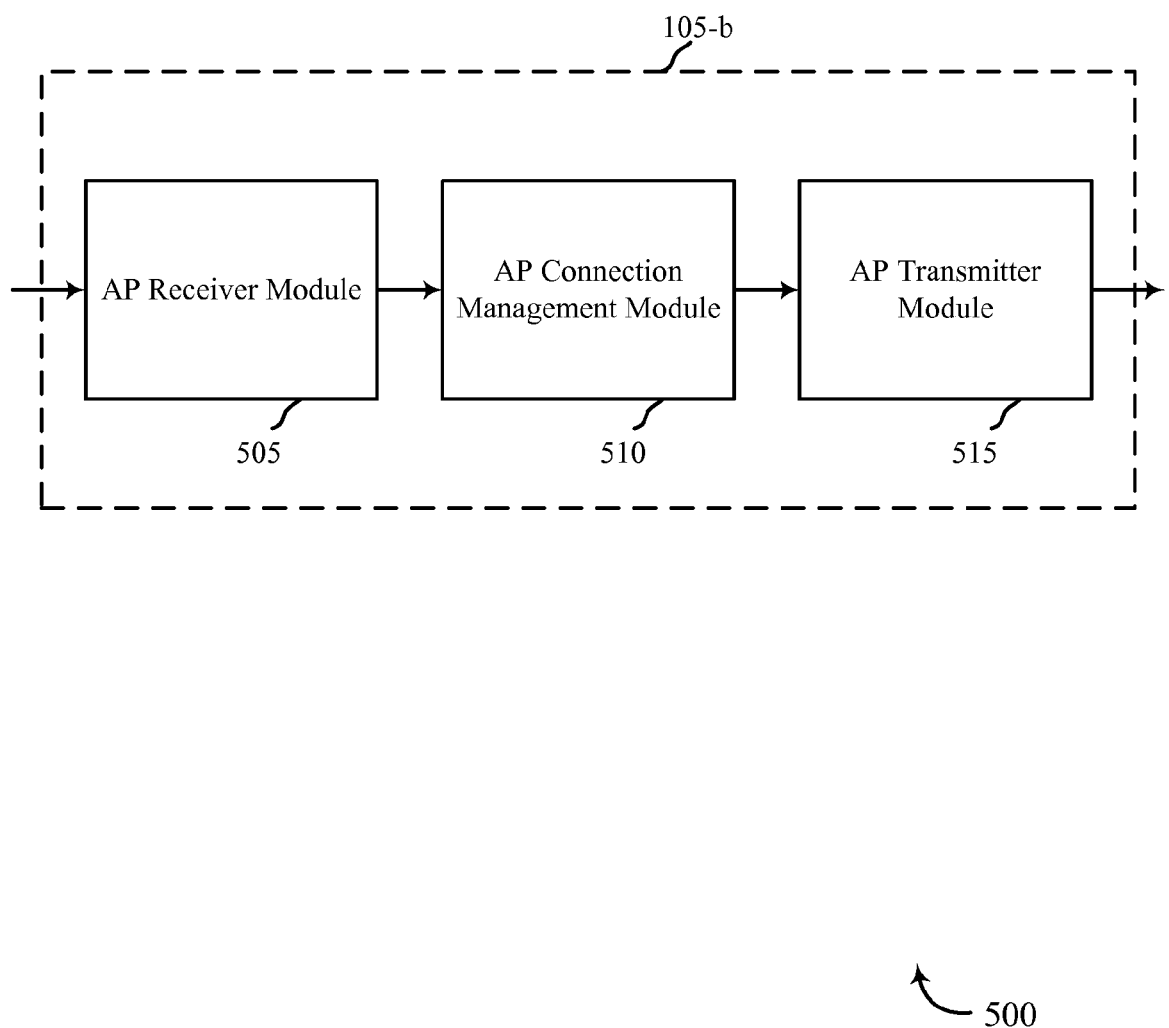
FIG. 5 shows a block diagram of an access point capable of avoiding bad wireless connections in accordance with various embodiments.

Referring now to FIG. 5, a block diagram 500 illustrates an AP 105-*b* capable of avoiding bad wireless connections, in accordance with various embodiments. The AP 105-*b* may be an example of one or more aspects of one of the APs 105 described with reference to FIG. 1. The AP 105-*b* may also be a processor. The AP 105-*b* may include an AP receiver module 505, an AP connection management module 510, and/or an AP transmitter module 515. Each of these components may be in communication with each other.

The components of the AP 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The AP receiver module 505 may include any number or types of receivers, and in some cases may include two or more wireless receivers, such as a cellular receiver and a wireless local area network (WLAN) receiver. In some cases, the cellular receiver may be or include an LTE/LTE-A receiver. The AP receiver module 505 may be used to receive various types of data and/or control signals (i.e., transmissions) over one or more communication channels of a wireless communications system, such as the wireless communications system 100 described with reference to FIG. 1.

The AP transmitter module 515 may include any number or types of transmitters, and in some cases may include two or more wireless transmitters, such as a cellular transmitter and a WLAN transmitter. In some cases, the cellular transmitter may be or include an LTE/LTE-A transmitter. The AP transmitter module 515 may be used to transmit various types of data and/or control signals over one or more communication channels of a wireless communications system, such as the wireless communications system 100.

The AP connection management module 510 may perform various functions. In some embodiments, the AP connection management module 510 may manage the connections that are made via the AP receiver module 505 and the AP transmitter module 515. For example, the AP connection management module 510 may manage connections by refusing to connect with mobile devices that are blacklisted. The AP connection management module 510 may identify each mobile device that attempts to connect or connects to the AP. If a connection with a mobile device is a bad connection (e.g., duration is less than a threshold and/or the connection ended because the mobile device left the coverage area of the AP), then the AP may associate the bad connection with the identified AP. When the identified mobile device is associated with a number of bad connections over a give time period that exceeds a threshold, the AP may blacklist the identified mobile device. As a result, the AP connection management module 510 may refuse to connect with the identified (blacklisted) mobile device. Since the identified mobile device is blacklisted, the AP will block the identified mobile device from connecting with the AP. As a result, the number of bad connections associated with the identified mobile device may, in time, fall below the threshold. Accordingly, the identified mobile device may have opportunities to have good connections with the AP.

Figure 6:
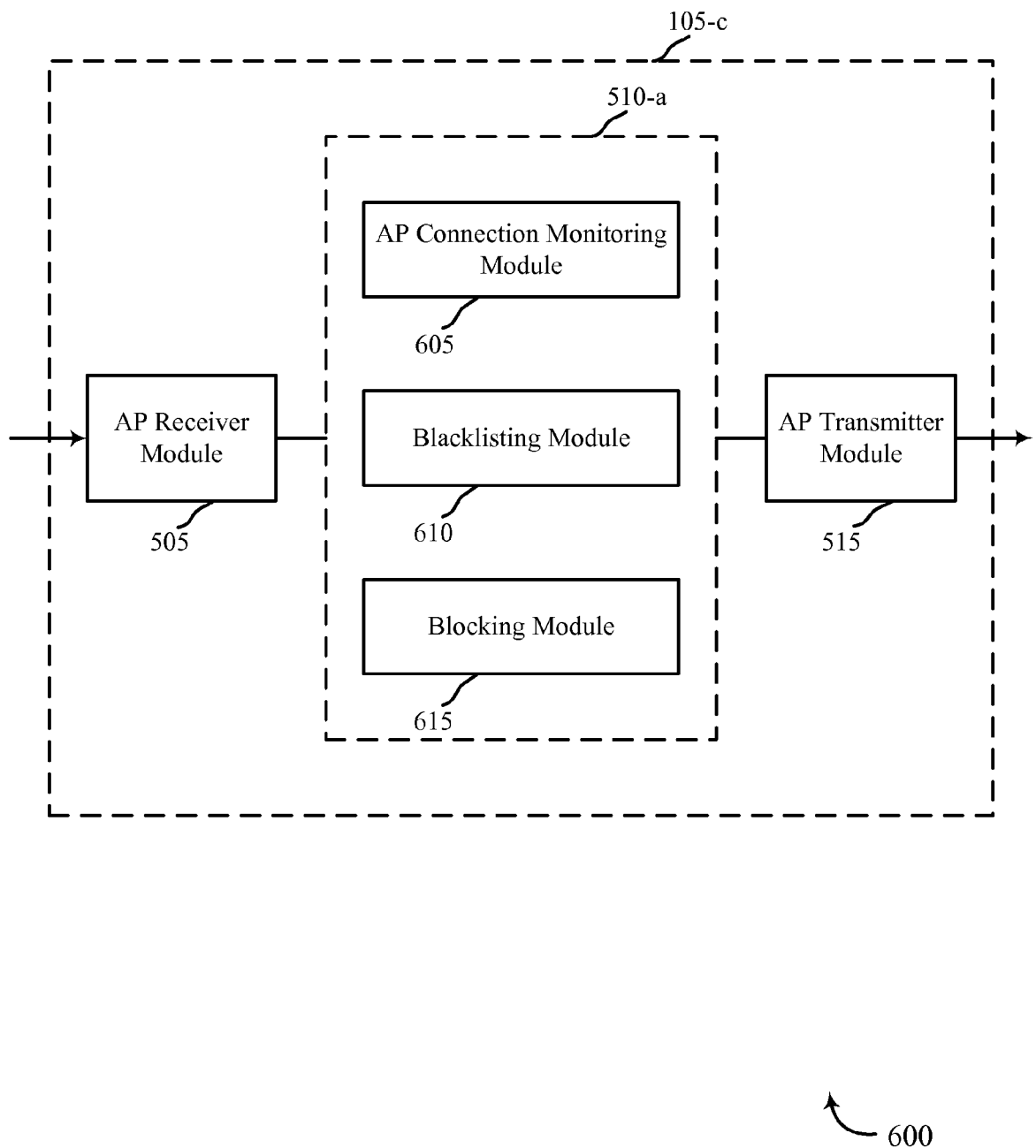
FIG. 6 shows a block diagram of another access point capable of avoiding bad wireless connections in accordance with various embodiments.

Referring now to FIG. 6, a block diagram 600 illustrates an AP 105-*c* capable of avoiding bad wireless connections, in accordance with various embodiments. The AP 105-*c* may be an example of one or more aspects of one of the APs 105 described with reference to FIG. 1. The AP 105-*c* may also be a processor. The AP 105-*c* may include an AP receiver module 505, an AP connection management module 510-*a*, and/or an AP transmitter module 515. Each of these components may be in communication with each other.

The components of the AP 105-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The AP receiver module 505 and AP transmitter module 515 may be configured similarly to what is described with respect to FIG. 5. The AP connection management module 510-*a* may be an example of one or more aspects of the AP connection management module 510 described with reference to FIG. 5 and may include an AP connection monitoring module 605, a blacklisting module 610, and/or a blocking module 615.

The AP connection monitoring module 605 may monitor a connection with an identified MS (e.g., MS 115-*a*). In some cases, the AP connection monitoring module 605 may monitor a connection to determine whether the duration of the connection satisfies a threshold (e.g., 60 seconds). If the duration of the connection is greater than the threshold, then the connection may be determined to be a good connection. If, however, the duration of the connection is less than the threshold, then the connection may be determined to be a bad connection. In other cases, the AP connection monitoring module 605 may monitor a connection to determine whether the duration of the connection satisfies a threshold and if the duration of the connection is less than the threshold, that the cause of the loss of the connection was the result of the MS leaving the coverage area of the AP. In these cases, the AP connection monitoring module 605 may associate a bad connection with an identified MS when both the duration of the connection is less than a threshold and the connection ended because the MS left the coverage area of the MS (or the coverage area left the MS, for example).

The blacklisting module 610 may blacklist an identified MS when the number of bad connections associated with the identified MS exceed a threshold. In some cases, the threshold may be a number of bad connections (e.g., 4) within a specified time period (e.g., 96 hours). As a result, the MSs that have a number of bad connections that is more than the threshold within the specified time period may be blacklisted. In other cases, the threshold may be the top percentage (e.g., 5%) of MSs that are ranked based on highest number of bad connections. As a result, the top percentage of the MSs with the highest number of bad connections may be blacklisted. In one example, the blacklisting module 610 may maintain at least a partial list of MSs that are associated with more than a particular number of bad connections. For instance, the blacklisting module 610 may rank the at least partial list of MSs according to number of bad connections within the specified time period.

The blocking module 615 may block connections from MSs that are blacklisted. In one example, the blocking module 615 may identify an MS associated with a connection request and may determine if the identified MS is blacklisted. If the identified MS is blacklisted, then the blocking module 615 may refuse the request for a connection from the identified MS. If the identified MS is not blacklisted, then the blocking module 615 may allow the AP 105-*c* to connect with the identified MS.

In some embodiments, the AP connection monitoring module 605, blacklisting module 610, and/or blocking module 615 may be implemented using a connection manager, a modem, and/or an operating system of the AP 105-*c*.

Figure 7:
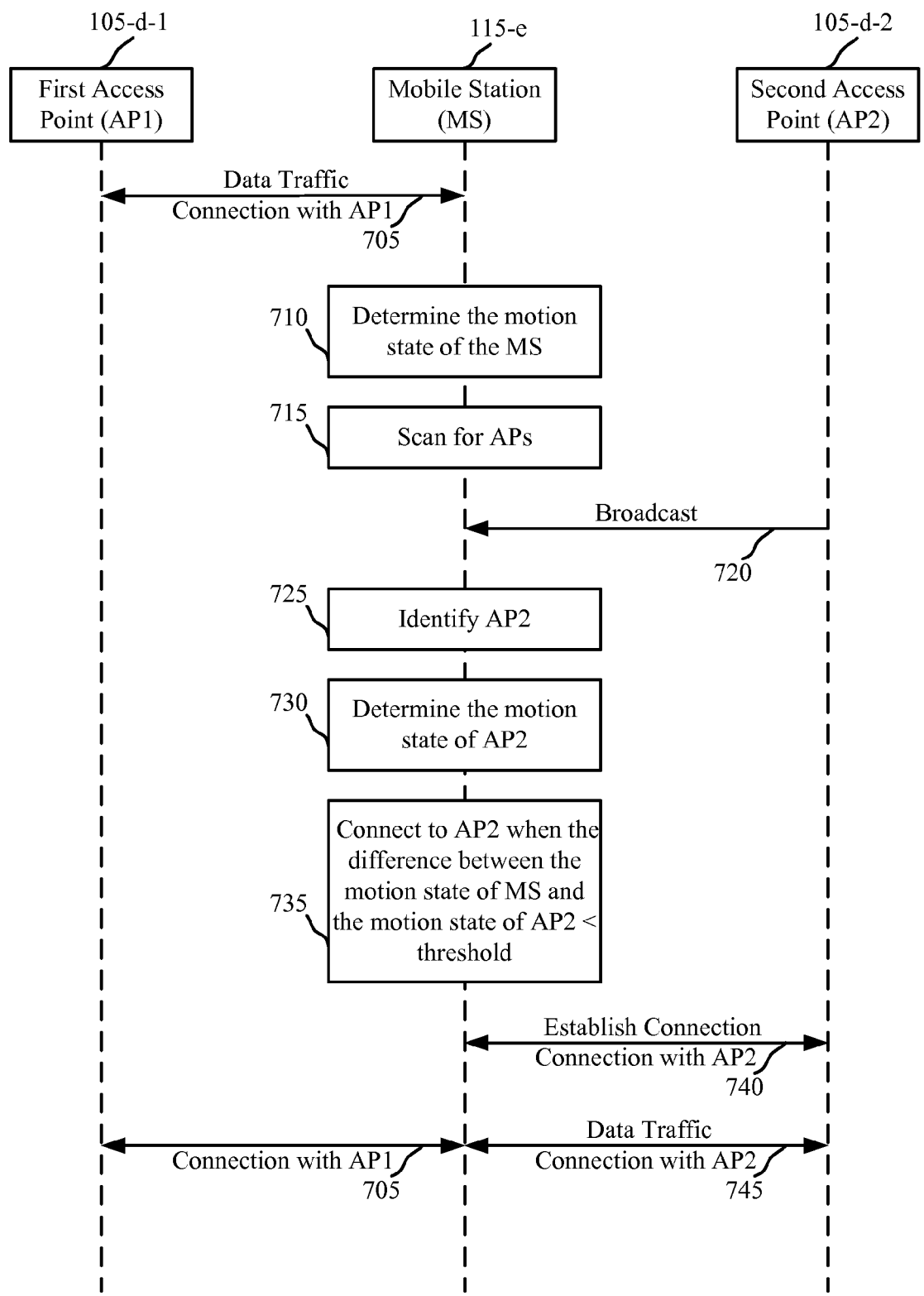
FIG. 7 shows a message flow diagram illustrating one embodiment of wireless communications between a mobile station and first and second access points, in accordance with various embodiments.

FIG. 7 is a message flow diagram 700 illustrating one embodiment of wireless communications between an MS 115-*e* and a first AP 105-*d*-1 and wireless communications between the MS 115-*e* and a second AP 105-*d*-2. In one example, the first AP 105-*d*-1 may be a macro cell AP and the second AP 105-*d*-2 may be a small cell AP. The MS 115-*e* may be an example of one or more aspects of the MS(s) 115 described with reference to FIGS. 1, 2, 3, and/or 4. The AP 105-*d*-1 and/or the AP 105-*d*-2 may be an example of one or more aspects of the AP(s) 105 described with reference to FIGS. 1, 5, and/or 6.

In one configuration, the MS 115-*e* may use a first connection with the first AP 105-*d*-1 for data transmissions. For example, the MS 115-*e* may have previously established a connection 705 with the first AP 105-*d*-1 to engage in wireless communications with the first AP 105-*d*-1. In one example, the MS 115-*e* may be using the connection 705 with the first AP 105-*d*-1 for data traffic.

At block 710, the MS 115-*e* may determine the motion state of the MS 115-*e*. For example, the MS 115-*e* may continuously monitor the motion state of the MS 115-*e*. In some embodiments, the motion state of the MS 115-*e* may be determined using the MS connection management module 210 described with reference to FIGS. 2, 3, and/or 4, and/or the motion state determination module 305 described with reference to FIGS. 3 and/or 4.

At block 715, the MS 115-*e* may scan for available APs. In some cases, the MS 115-*e* may periodically scan for available APs. Upon scanning for available APs, the MS 115-*e* may receive a broadcast 720 from a second AP 105-*d*-2. In some cases, the broadcast 720 may include information that may be used to identify the second AP 105-*d*-2. For example, the broadcast 720 may include a service set identifier (SSID). In various situations, the MS 115-*e* may enter the coverage area of a second AP 105-*d*-2, but may not recognize that it is within the coverage area of the second AP 105-*d*-2 until scan for APs at block 715. At block 725, the MS 115-*e* may identify the second AP 105-*d*-2 based at least in part on the received broadcast 720.

At block 730, the MS 115-*e* may determine the motion state of the second AP 105-*d*-2. In some cases, the MS 115-*e* may determine the motion state of the second AP 105-*d*-2 based on information obtained about the second AP 105-*d*-2. For example, the MS 115-*e* may obtain crowd sourced information about the motion state for the second AP 105-*d*-2. In another example, the MS 115-*e* may have previously learned the motion state of the second AP 105-*d*-2 and may obtain the motion state of the second AP 105-*d*-2 from information stored about the second AP 105-*d*-2. In some cases, the MS 115-*e* may learn or relearn the motion state of the second AP 105-*d*-2 and update the information stored about the second AP 105-*d*-2 by monitoring each established connection with the second AP 105-*d*-2. Although not shown, the MS 115-*e* may learn or relearn the motion state of the second AP 105-*d*-2 based on a connection 740 with the second AP 105-*d*-2.

At block 735, the MS 115-*e* may determine to connect to and use the second AP 105-*d*-2 when the difference between the motion state of the MS 115-*e* and the motion state of the second AP 105-*d*-2 is less than a threshold. For example, when the motion of the MS 115-*e* relative to the motion of the second AP 105-*d*-2 is within the threshold. For instance, the MS 115-*e* may determine to connect to and use the second AP 105-*d*-2 when the second AP 105-*d*-2 is stationary and the MS 115-*e* is stationary or moving slowly around (e.g., walking) However, the MS 115-*e* may not determine to connect to and/or use the second AP 105-*d*-2 when the second AP 105-*d*-2 is stationary and the MS 115-*e* is moving quickly (e.g., driving) or the MS 115-*e* is stationary and the second AP 105-*d*-2 is moving quickly.

Upon determining to connect to and use the second AP, the MS 115-*e* may establish a connection 740 with the second AP 105-*d*-2 and may switch the data traffic 745 from the connection 705 with the first AP 105-*d*-1 to the connection 740 with the second AP 105-*d*-2. Upon switching the data traffic 745, the MS 115-*e* may maintain the connection 705 with the first AP 105-*d*-1. For example, the MS 115-*e* may maintain an active (e.g., in an active state) connection 705 with the first AP 105-*d*-1. In another example, the MS 115-*e* may maintain an idle (e.g., in an idle state) connection 705 with the first AP 105-*d*-1. Alternatively, the MS 115-*e* may not maintain (e.g., disconnect, drop) the connection 705 with the first AP 105-*d*-1. In some cases, the MS 115-*e* may continue to monitor the motion state of the MS 115-*e* and may monitor the connection 740 to learn or relearn the motion state of the second AP 105-*d*-2. Although FIG. 7 depicts the various blocks in a particular order, it is understood, that the blocks may be rearranged in a variety of ways. For example, one possible order may proceed from block 715 to broadcast 720 and from broadcast 720 to block 710, with the establishment of the connection occurring at the end, as shown.

Figure 8:
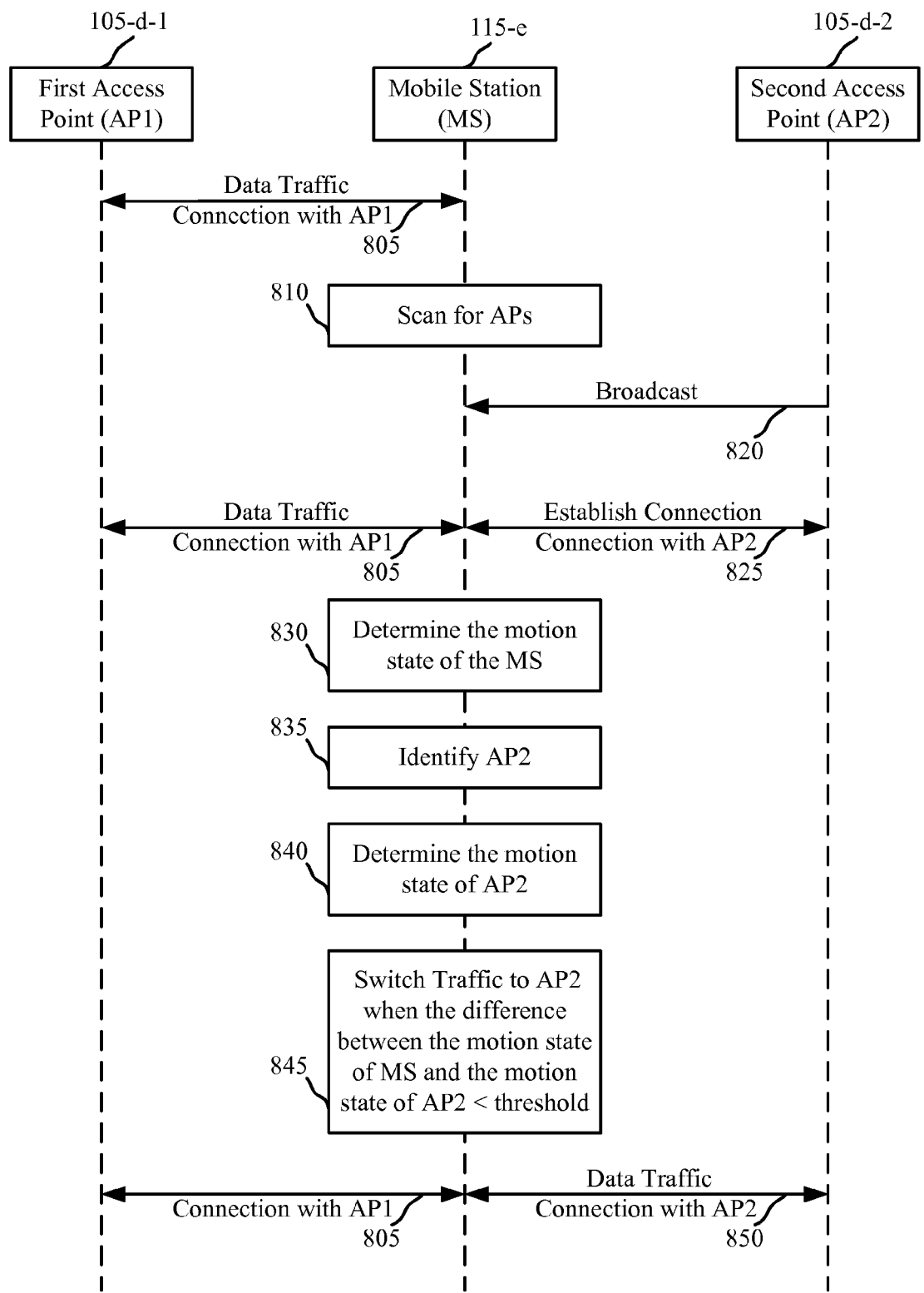
FIG. 8 shows a message flow diagram illustrating another embodiment of wireless communications between a mobile station and first and second access points, in accordance with various embodiments.

FIG. 8 is a message flow diagram 800 illustrating another embodiment of wireless communications between the MS 115-*e* and the first AP 105-*d*-1 and wireless communications between the MS 115-*e* and the second AP 105-*d*-2. The embodiment illustrated in the message flow diagram 800 may be similar to the embodiment illustrated in the message flow diagram 700. However, in this embodiment, the MS 115-*e* may automatically connect to available APs.

As described previously, the MS 115-*e* may use a first connection 805 with the first AP 105-*d*-1 for data transmissions. At block 810, the MS 115-*e* may scan for APs. Upon scanning for APs, the MS 115-*e* may receive a broadcast 820 and may establish a connection 825 with the second AP 105-*d*-2. Although the MS 115-*e* has established a connection 825 with the second AP 105-*d*-2, the MS 115-*e* may continue to use the connection 805 with the first AP 105-*d*-1 for data traffic.

At block 830, the MS 115-*e* may determine the motion state of the MS 115-*e*. At block 835, the MS 115-*e* may identify the second AP 105-*d*-2. At block 840, the MS 115-*e* may determine the motion state of the second AP 105-*d*-2.

At block 845, the MS 115-*e* may determine to use the connection 825 with the second AP 105-*d*-2 for data transmissions when the difference between the motion state of the MS 115-*e* and the motion state of the second AP 105-*d*-2 is less than a threshold. For example, when the motion of the MS 115-*e* relative to the motion of the second AP 105-*d*-2 is within the threshold. For instance, the MS 115-*e* may determine to switch traffic 850 and use the connection 825 with the second AP 105-*d*-2 when the second AP 105-*d*-2 is stationary and the MS 115-*e* is stationary or moving slowly around (e.g., walking) However, the MS 115-*e* may not determine to switch traffic and use the connection with the second AP 105-*d*-2 when the second AP 105-*d*-2 is stationary and the MS 115-*e* is moving quickly (e.g., driving) or the MS 115-*e* is stationary and the second AP 105-*d*-2 is moving quickly. When the MS 115-*e* determines to switch traffic 850, the MS 115-*e* may determine to maintain the connection 805 in an active state, maintain the connection 805 in an idle state, or to not maintain the connection 805.

Figure 9:
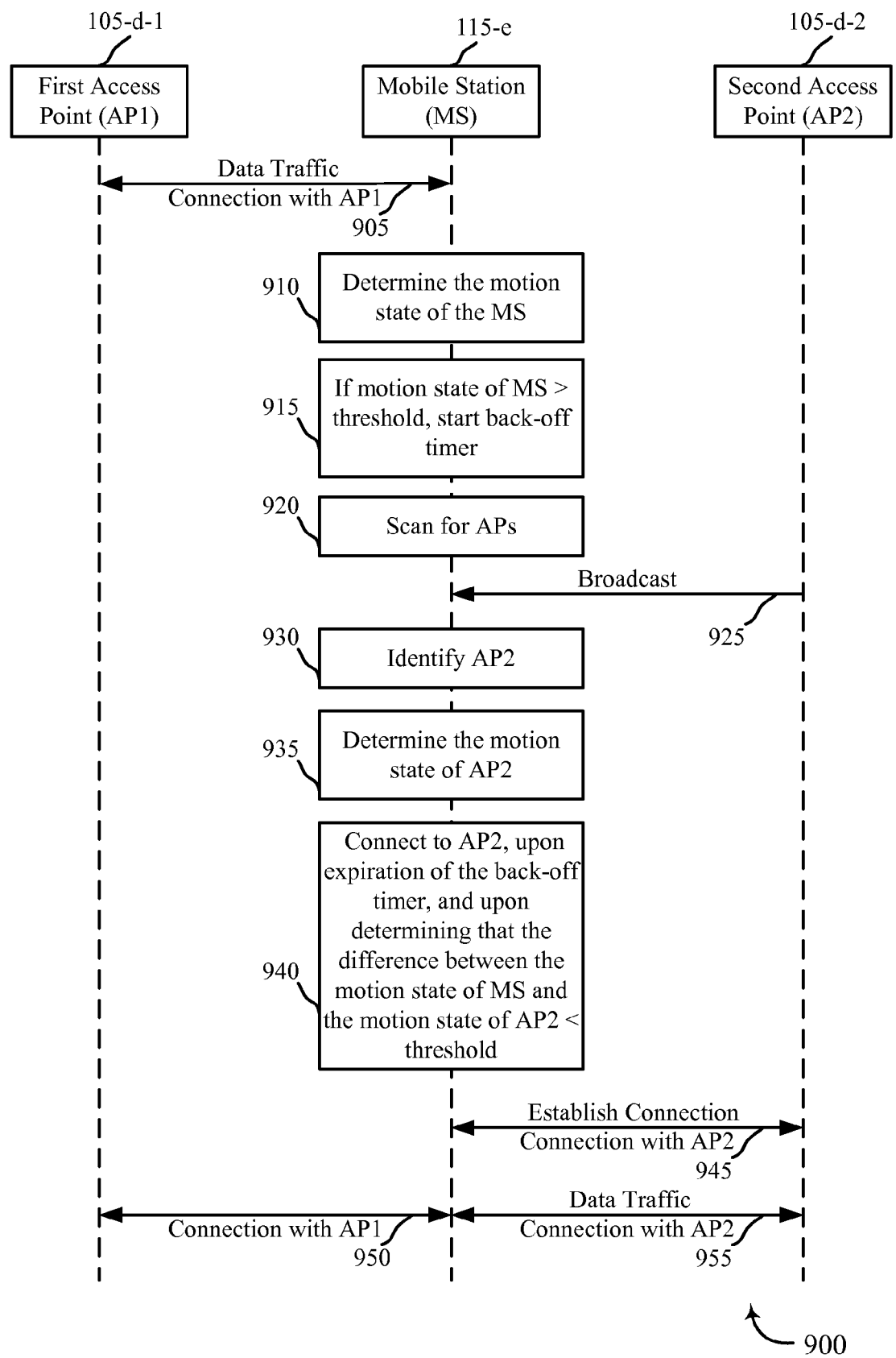
FIG. 9 shows a message flow diagram illustrating yet another embodiment of wireless communications between a mobile station and first and second access points, in accordance with various embodiments.

FIG. 9 is a message flow diagram 900 illustrating another embodiment of wireless communications between the MS 115-*e* and the first AP 105-*d*-1 and wireless communications between the MS 115-*e* and the second AP 105-*d*-2. The embodiment illustrated in the message flow diagram 900 may be similar to the embodiments illustrated in the message flow diagram 700 and may be similarly adapted to be used in the embodiment illustrated in message flow diagram 800. However, in this embodiment, the MS 115-*e* may delay connecting to and/or using a connection with the second AP 105-*d*-2 until after the expiration of a back-off timer.

As described previously, the MS 115-*e* may use a first connection 905 with the first AP 105-*d*-1 for data transmissions. At block 910, the MS 115-*e* may determine the motion state of the MS 115-*e*.

At block 915, the MS 115-*e* may determine if the motion state of the MS 115-*e* exceeds a threshold. If the motion state of the MS 115-*e* exceeds the threshold, then a back-off timer may be started. In some cases, the back-off timer may be started based on a change in motion and/or the motion state of the MS 115-*e*. In other cases, the back-off timer may be started based on the detection of an available AP. In the case that an AP specific back-off timer (e.g., back-off time) has been obtained (e.g., learned), then the MS 115-*e* may use the obtained AP specific back-off timer. In the case, that an AP specific back-off timer for the AP has not been obtained, then a default back-off timer (with a default time, 60 seconds, for example) may be used. In one example, a back-off timer may be started (based on the default time, for example), and upon identification of the AP, the AP specific time may be used instead of the default time.

At block 920, the MS 115-*e* may scan for APs. Upon scanning for APs, the MS 115-*e* may receive a broadcast 925. At block 930, the MS 115-*e* may identify the second AP 105-*d*-2 based on the broadcast 925. At block 935, the MS 115-*e* may determine the motion state of the second AP 105-*d*-2.

At block 940, the MS 115-*e* may determine to connect to and/or use the second AP 105-*d*-2 upon expiration of the back-off timer and when the difference between the motion state of the MS 115-*e* and the motion state of the second AP 105-*d*-2 satisfies a threshold. For example, upon expiration of the back-off timer, the MS 115-*e* may determine if the motion state of the MS 115-*e* relative to the motion state of the second AP 105-*d*-2 satisfies the threshold. As a result, the MS 115-*e* may only determine to connect to and/or use the second AP 105-*d*-2 after the expiration of the back-off timer and when the relative motion between the MS 115-*e* and the second AP 105-2 satisfy the threshold.

Upon determining to connect to and/or use the second AP, the MS 115-*e* may establish a connection 945 with the second AP 105-*d*-2 and may switch the data traffic 955 from the connection 905 with the first AP 105-*d*-1 to the connection 945 with the second AP 105-*d*-2. In some cases, the MS 115-*e* may continue to monitor the motion state of the MS 115-*e* and may monitor the connection 945 to learn or update the motion state of the second AP 105-*d*-2. Additionally or alternatively, the MS 115-*e* may monitor the motion state of the MS 115-*e* and may monitor the connection 945 to learn or adjust the duration of the back-off timer. For example, upon expiration of the back-off timer, if the duration of the connection 945 established with the second AP 105-*d*-2 is less than a threshold, then the MS 115-*e* may determine to increase the duration of the back-off timer (for subsequent connections with the second AP 105-*d*-2). In another example, if upon expiration of the back-off timer the duration of the connection 945 established with the second AP 105-*d*-2 is greater than the threshold, then based on an analysis of the motion state of the MS 115-*e*, the MS 115-*e* may reduce the duration of the back-off timer (for subsequent connections with the second AP 105-*d*-2). In some cases, the MS 115-*e* may generate a unique (e.g., AP specific) back-off timer for each AP that a back-off timer is used with. In some embodiments, a back-off timer may be triggered any time the motion state of the MS 115-*e* exceeds a threshold.

Figure 10:
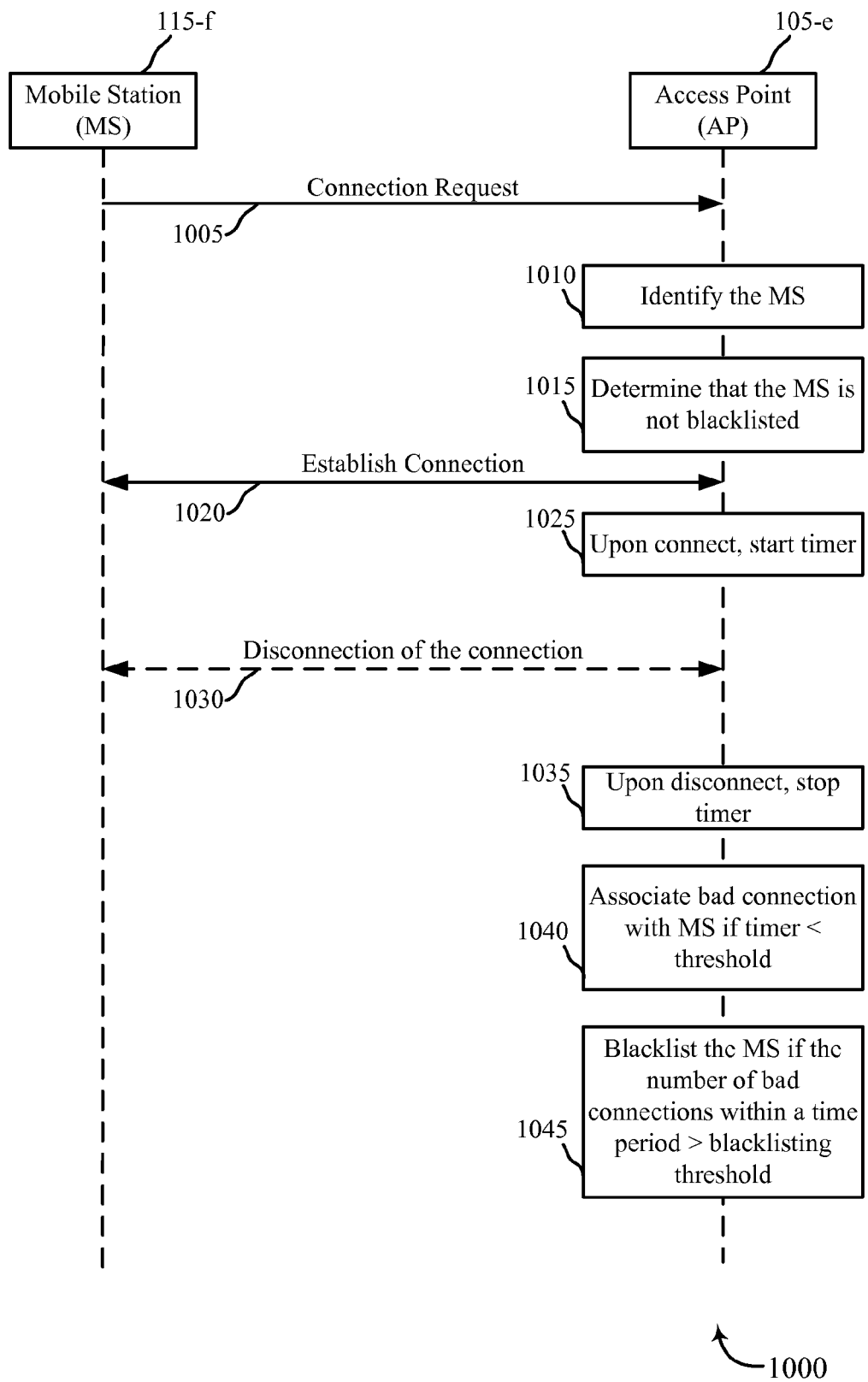
FIG. 10 shows a message flow diagram illustrating one embodiment of wireless communications between a mobile station and an access point, in accordance with various embodiments.

FIG. 10 is a message flow diagram 1000 illustrating one embodiment of wireless communications between an MS 115-*f* and an AP 105-*e*. The AP 105-*e* may be an example of one or more aspects of the access point(s) 105 described with reference to FIG. 1. In one example, the AP 105-*e* may be a small cell AP. The MS 115-*f* may be an example of one or more aspects of the MS(s) 115 described with reference to FIGS. 1, 2, 3, 4, 7, 8, and/or 9. The AP 105-*e* may be an example of one or more aspects of the AP(s) 105 described with reference to FIGS. 1, 5, 6, 7, 8, and/or 9.

In one configuration, the AP 105-*e* may receive a connection request 1005 from a MS 115-*f*. In one example, the MS 115-*f* may transmit a connection request 1005 in an attempt to connect to the AP 105-*e*.

At block 1010, the AP 105-*e* may identify the MS 115-*f*. For example, the AP 105-*e* may identify the MS 115-*f* based on the received connection request 1005. At block 1015, the AP 105-*e* may determine if the MS 115-*f* is blacklisted. Upon determining that the MS 115-*f* is not blacklisted, the AP 105-*e* may send a response to the connection request and may establish a connection 1020 with the identified MS 115-*e*.

At block 1025, the AP 105-*e* may start a timer upon establishing the connection 1020 with the MS 115-*f*. In some cases, the AP 105-*e* may monitor the connection 1020 with the MS 115-*f*. For example, the AP 105-*e* may monitor the connection 1020 to detect a disconnection 1030 of the connection 1020. At block 1035, the AP 105-*e* may stop the timer upon detecting the disconnection 1030 of the connection 1020. As a result of starting the timer upon connection 1020 and stopping the timer upon ending of the connection (e.g., disconnect 1030), the duration of the timer may correspond to the duration of the connection 1020. In some cases, the AP 105-*e* may determine if the connection 120 is a good connection (e.g., duration of the timer is greater than a threshold) or a bad connection (e.g., duration of the timer is less than the threshold) based on the duration of the timer.

At block 1040, a bad connection may be associated with the identified MS 115-*f* when the duration of the timer is less than a threshold. In some cases, the AP 105-*e* may maintain a list of MSs along with the number of bad connections associated with each MS.

At block 1045, the AP 105-*e* may blacklist the MS 115-*e* if the number of bad connections associated with the MS 115-*e* is greater than a blacklisting threshold. In some cases, the blacklisting threshold may be time limited. For example, the blacklisting threshold may correspond to a number of bad connections within the last period of time (e.g., 48 hours). Since blacklisted MSs are blocked from connecting with the AP 105-*e*, the number of bad connections associated with an MS may not be increased once the MS is blacklisted. As a result, a blacklisted MS may, over time, be removed from the blacklist as the number of bad connections within the last period of time reduces with the passage of time. Accordingly, a blacklisted MS may, at a later point in time, become unblacklisted and may reconnect with the AP 105-*e*. In this way, a MS that was previously blacklisted may have opportunities to establish good connections with the AP 105-*e*. In some cases, the blacklisting threshold may be dynamic. For example, the blacklisting threshold may be the top percentage MSs with the most bad connections (within a given period of time, for example). As a result, a MS may become blacklisted or unblacklisted based on the number of bad connections associated with other MSs. For instance, if other MSs accumulate more bad connections, then an MS may no longer be in the top percentage of MSs with bad connections. Similarly, if the number of bad connections for other MSs is reducing (due to the passage of time, for example) then an MS may become in the top percentage of MSs with bad connections, and therefore become blacklisted. As a result, a MS may be blacklisted or unblacklisted without any interaction with the AP.

Figure 11:
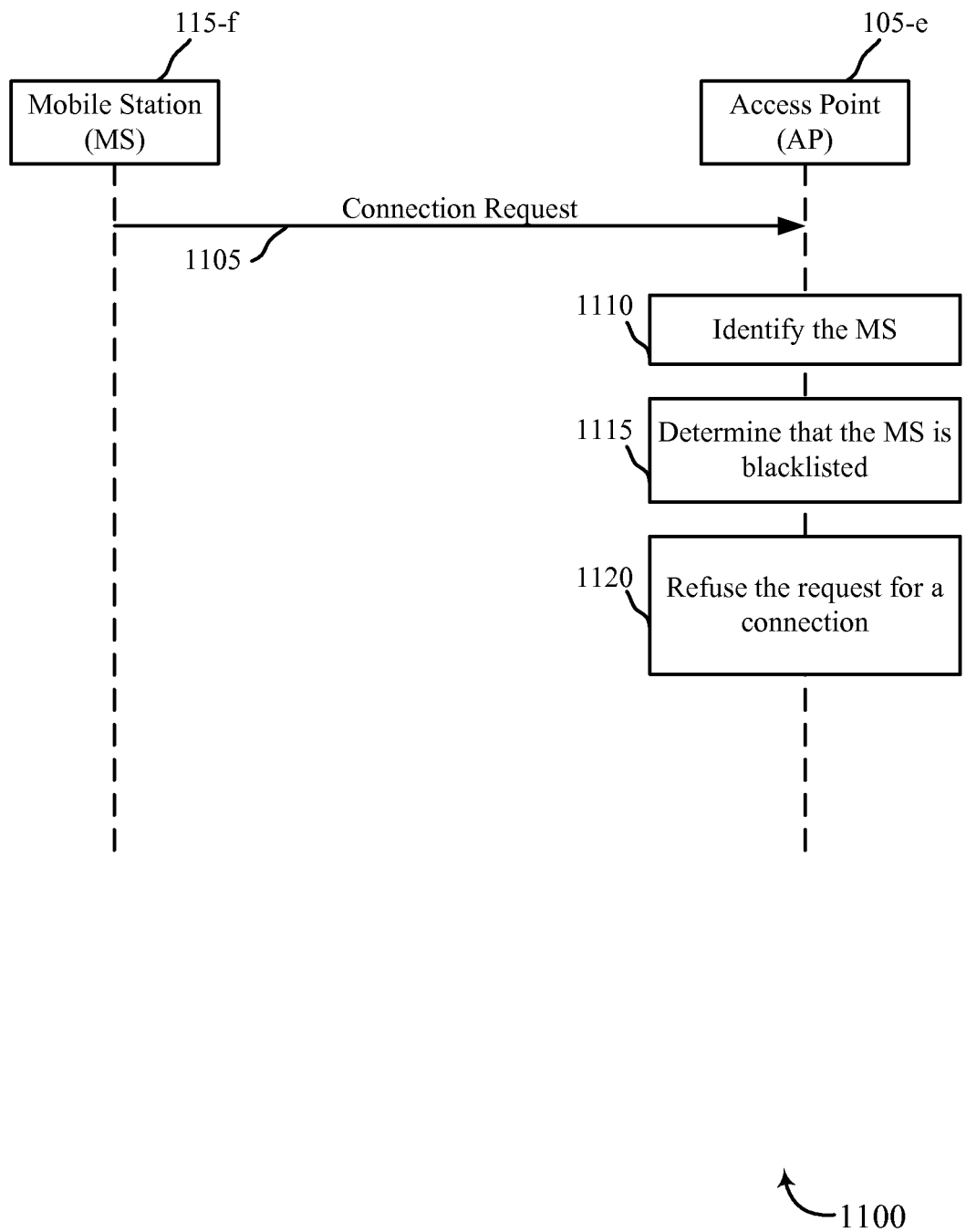
FIG. 11 shows a message flow diagram illustrating another embodiment of wireless communications between a mobile station and an access point, in accordance with various embodiments.

FIG. 11 is a message flow diagram 1100 illustrating another embodiment of wireless communications between an MS 115-*f* and an AP 105-*e*. The embodiment illustrated in the message flow diagram 1100 may be similar to the embodiment illustrated in the message flow diagram 1000. However, in this embodiment, the MS 115-*f* may be blacklisted.

As discussed previously, the AP 105-*e* may receive a connection request 1105 from an MS 115-*f*. At block 1110, the AP 105-*e* may identify the MS 115-*f*. For example, the AP 105-*e* may identify the MS 115-*f* based on the received connection request 1105. At block 1115, the AP 105-*e* may determine that the MS 115-*f* is blacklisted.

At block 1120, upon determining that the MS 115-*f* is blacklisted, the AP 105-*e* may refuse the request for a connection 1105 from the MS 115-*f*. In some cases, the AP 105-*e* may ignore the connection request 1105. For example, the AP 105-*e* may determine to not respond to the connection request 1105. In other cases (not shown), the AP 105-*e* may send a response to the MS 115-*f* indicating that the AP 105-*e* refuses to connect with the MS 115-*f*.

Figure 12:
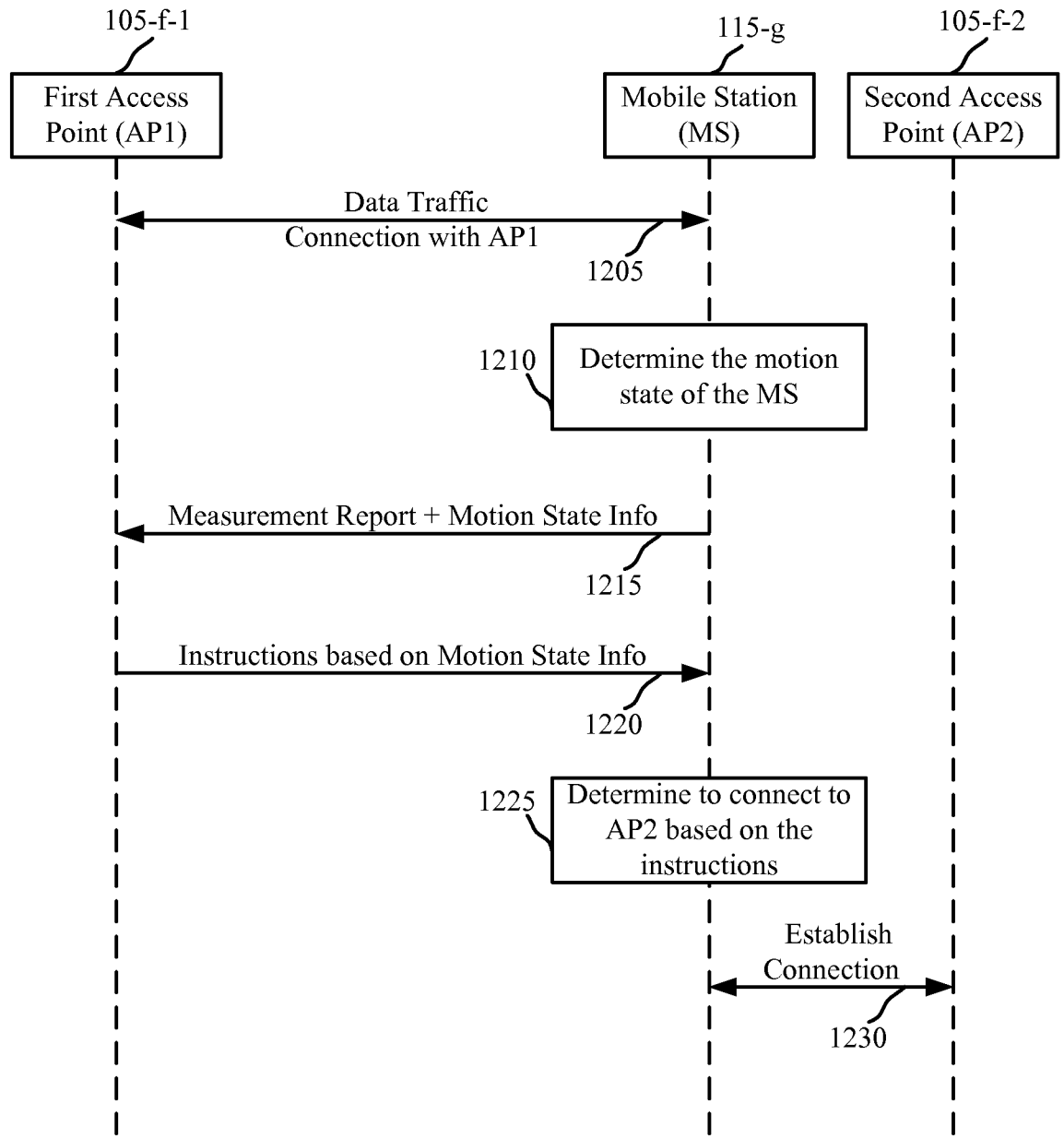
FIG. 12 shows a message flow diagram illustrating one embodiment of network managed wireless communications between a mobile station and first and second access points, in accordance with various embodiments.

FIG. 12 is a message flow diagram 1200 illustrating one embodiment of network managed wireless communications between an MS 115-*g* and a first AP 1054-1 and network managed wireless communications between the MS 115-*g* and a second AP 1054-2. The APs 1054-1, 1054-2 may be examples of one or more aspects of the access point(s) 105 described with reference to FIG. 1. In one example, the first AP 1054-1 may be a macro cell AP and the second AP 1054-2 may be a small cell AP. The MS 115-*g* may be an example of one or more aspects of the MS(s) 115 described with reference to FIGS. 1, 2, 3, 4, 7, 8, 9, 10, and/or 11. The AP 1054-1 and/or the AP 1054-2 may be an example of one or more aspects of the AP(s) 105 described with reference to FIGS. 1, 5, 6, 7, 8, 9, 10, and/or 11.

In one configuration, the MS 115-*g* may use a first connection 1205 with the first AP 1054-1 for data transmissions. For example, the MS 115-*g* may have previously established a connection 1205 with the first AP 1054-1 to engage in wireless communications with the first AP 1054-1. In one example, the MS 115-*g* may be using the connection 1205 with the first AP 1054-1 for data traffic. At block 1210, the MS 115-*g* may determine the motion state of the MS 115-*g*.

Upon determining the motion state of the MS 115-*g*, the MS 115-*g* may generate 1215 a measurement report that includes motion state information about the MS 115-*g*. The MS 115-*g* may transmit the measurement report that includes the motion state information to the first AP 1054-1 (e.g., the serving cell). The MS 115-*g* may receive a response 1220 regarding the measurement report that includes the motion state information. In some cases, where the network decides to not instruct the MS 115-*g* to connect to another AP, the MS 115-*g* may receive instructions based on the motion state information. For example, the instructions based on the motion state information may be an acknowledgment (ACK) regarding the measurement report 1215 with no instructions for connecting to another AP. In other cases, where the network decides to instruct the MS 115-*g* to connect to another AP (e.g., the second AP 105-*f*-2), the MS 115-*g* may receive an acknowledgment (ACK) regarding the measurement report 1215 as well as instructions for connecting to another AP (e.g., the second AP 105-*f*-2).

At block 1225, the MS 115-*g* may determine whether to connect to the second AP 1054-2 based on the instructions 1220. Upon determining that the instructions 1220, include instructions for connecting to the second AP 105-*f*-2, the MS 115-*g* may determine to connect to the second AP 105-*f*-2 based on the instructions. Upon determining to connect to the second AP 105-*f*-2, the MS 115-*g* may establish a connection 1230 with the second AP 105-*f*-2. In some cases, the MS 115-*g* may switch traffic to use the established connection 1230 with the second AP 105-*f*-2.

Figure 13:
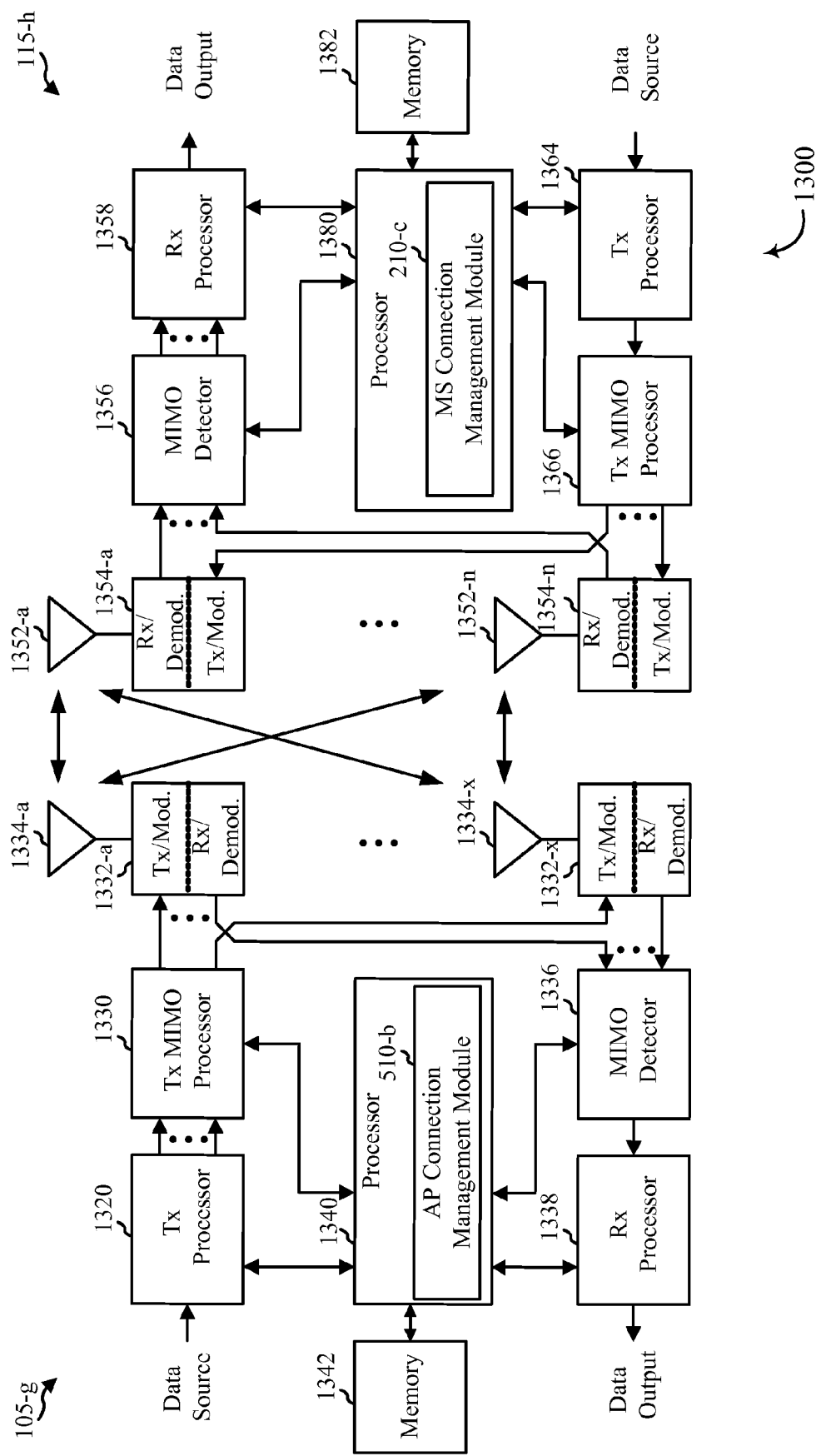
FIG. 13 is a block diagram of a MIMO communication system in accordance with various embodiments.

FIG. 13 is a block diagram of a MIMO communication system 1300 including a AP 105-*g* and a MS 115-*h*. This system 1300 may illustrate aspects of the system 100 of FIG. 1. The AP 105-*g* may be equipped with antennas 1334-*a* through 1334-*x*, and the MS 115-*h* may be equipped with antennas 1352-*a* through 1352-*n*. In the system 1300, the AP 105-*g* may be able to send data over multiple communication links at the same time. Each communication link may be called a "layer" and the "rank" of the communication link may indicate the number of layers used for communication. For example, in a 2×2 MIMO system where AP 105-*g* transmits two "layers," the rank of the communication link between the AP 105-*g* and the MS 115-*h* is two.

At the AP 105-*g*, a transmit processor 1320 may receive data from a data source. The transmit processor 1320 may process the data. The transmit processor 1320 may also generate reference symbols, and a cell-specific reference signal. A transmit (TX) MIMO processor 1330 may perform spatial processing (e.g., precoding) on data symbols, control symbols, and/or reference symbols, if applicable, and may provide output symbol streams to the transmit modulators 1332-*a* through 1332-*x*. Each modulator 1332 may process a respective output symbol stream (e.g., for OFDM, etc.) to obtain an output sample stream. Each modulator 1332 may further process (e.g., convert to analog, amplify, filter, and upconvert) the output sample stream to obtain a downlink (DL) signal. In one example, DL signals from modulators 1332-*a* through 1332-*x* may be transmitted via the antennas 1334-*a* through 1334-*x*, respectively.

At the MS 115-*h*, the MS antennas 1352-*a* through 1352-*n* may receive the DL signals from the AP 105-*g* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols if applicable, and provide detected symbols. A receive processor 1358 may process (e.g., demodulate, deinterleave, and decode) the detected symbols, providing decoded data for the MS 115-*h* to a data output, and provide decoded control information to a processor 1380, or memory 1382.

The processor 1380 may in some cases execute stored instructions to instantiate an MS connection management module 210-*c*. In some embodiments, the MS connection management module 210-c may be an example of one or more aspects of the MS connection management module 210 described with reference to FIGS. 2, 3, and/or 4. In some embodiments, the MS connection management module 210-c may determine whether to connect to and/or use the AP 105-g based on the motion state of the MS 115-h. In other cases, the MS connection management module 210-c may determine whether to connect to and/or use the AP 105-g based on the motion state of the MS 115-h and the motion state of the AP 105-g. In one example, the MS 115-h may be connected to a first AP 105-g (e.g., macro cell AP) and may determine whether to connect to a second AP 105-g (e.g., small cell AP). In some cases, the MS 115-h may use one or more of the antennas 1352-a through 1352-n, the modulators/demodulators 1354-a through 1354-n, the MIMO detector 1356, the receive processor 1358, the transmit processor 1364, and/or the MIMO processor 1366 to communicate with the first AP 105-g and/or the second AP 105-g.

On the uplink (UL), at the MS 115-h, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-a through 1354-n (e.g., for SC-FDMA, etc.), and be transmitted to the AP 105-g in accordance with the transmission parameters received from the AP 105-g. At the AP 105-g, the UL signals from the MS 115-h may be received by the antennas 1334, processed by the demodulators 1332, detected by a MIMO detector 1336 if applicable, and further processed by a receive processor 1338. The receive processor 1338 may provide decoded data to a data output and to the processor 1340.

The processor 1340 may in some cases execute stored instructions to instantiate an AP connection management module 510-c. In some embodiments, the AP connection management module 510-c may be an example of one or more aspects of the AP connection management module 510 described with reference to FIGS. 5 and/or 6. In some embodiments, the AP connection management module 510-c may determine whether to blacklist a MS and may refuse to connect with a blacklisted MS. For example, the AP connection management module 510-c may receive a connection request from a MS 115-h, determine whether the MS 115-h is blacklisted. If the MS 115-h is blacklisted, the AP connection management module 510-c may refuse the request for a connection. If, however, the MS 115-h is not blacklisted, the AP connection management module 510-c may connect with the MS 115-h and may monitor the connection with the MS 115-h to determine if the connection with the MS 115-h has a duration longer than a threshold. If the duration of the connection is less than the threshold, then a bad connection may be associated with the MS 115-h. If the number of bad connections associated with the MS 115-h exceeds a threshold (e.g., number of connections within a most recent predetermined period) then the AP connection management module 510-c may blacklist the MS 115-h.

The components of the MS 115-h may, individually or collectively, be implemented with one or more Application Specific Integrated Circuits (ASICs) adapted to perform some or all of the applicable functions in hardware. Each of the noted modules may be a means for performing one or more functions related to operation of the system 1300. Similarly, the components of the AP 105-g may, individually or collectively, be implemented with one or more Application Specific Integrated Circuits (ASICs) adapted to perform some or all of the applicable functions in hardware. Each of the noted components may be a means for performing one or more functions related to operation of the system 1300.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Figure 14:
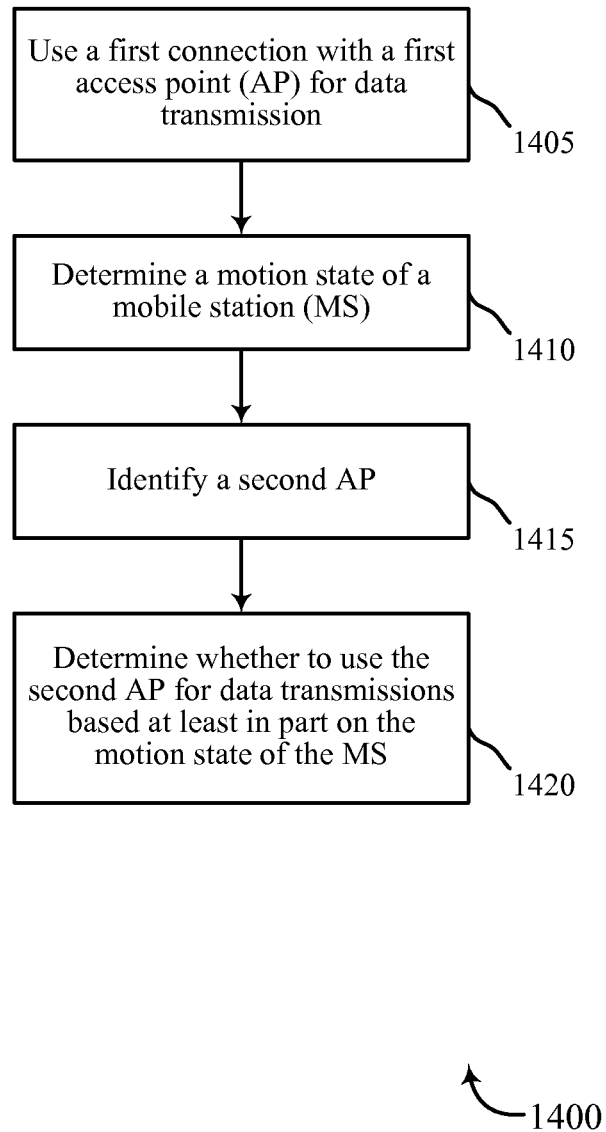
FIGS. 14-18 are flowcharts of methods for avoiding bad wireless connections, in accordance with various embodiments.

FIG. 14 is a flow chart illustrating a method 1400 for avoiding bad connections. For clarity, the method 1400 is described below with reference to one of the MSs 115 described with reference to FIGS. 1, 2, 3, 4, 7, 8, 9, 10, 11, 12, and/or 13. In one implementation, the MS connection management module 210 described with reference to FIGS. 2, 3, 4, and/or 13 may execute one or more sets of codes to control the functional elements of an MS 115 to perform the functions described below.

At block 1405, a first connection with a first AP may be used for data transmissions.

At block 1410, a motion state of an MS may be determined. For example, the motion state of the MS may be determined based on sensor data for at least one sensor within the MS. In one example, the sensor data may include sensor data from a magnetometer (acceleration of movement of the MS, for example). Additionally or alternatively, the sensor data may include sensor data from a gyroscope (angular rotational velocity, for example). In some embodiments, the motion state of the MS may be determined using the motion state determination module 305 described with reference to FIGS. 3 and/or 4.

At block 1415, a second AP may be identified. For example, a second AP may be detected during a scan for available APs and may be identified based on a broadcast signal from the AP. In some embodiments, the operation(s) at block 1415 may be performed by the connection usage module 310 described with reference to FIGS. 3 and/or 4.

At block 1420, a determination may be made, based at least in part on the motion state of the MS, as to whether to use the second AP for data transmissions. In some embodiments, the first AP may be a macro cell AP and the second AP may be a small cell AP. In these embodiments, the motion state of the MS may be predictive of whether the MS will be in the coverage area of the second AP for a sufficient amount of time that a connecting to and/or using the second AP may be beneficial.

Therefore, the method 1400 may be used for avoiding bad connections with APs (e.g., small cell APs). It should be noted that the method 1400 is just one implementation and that the operations of the method 1400 may be rearranged or otherwise modified such that other implementations are possible.

Figure 15:
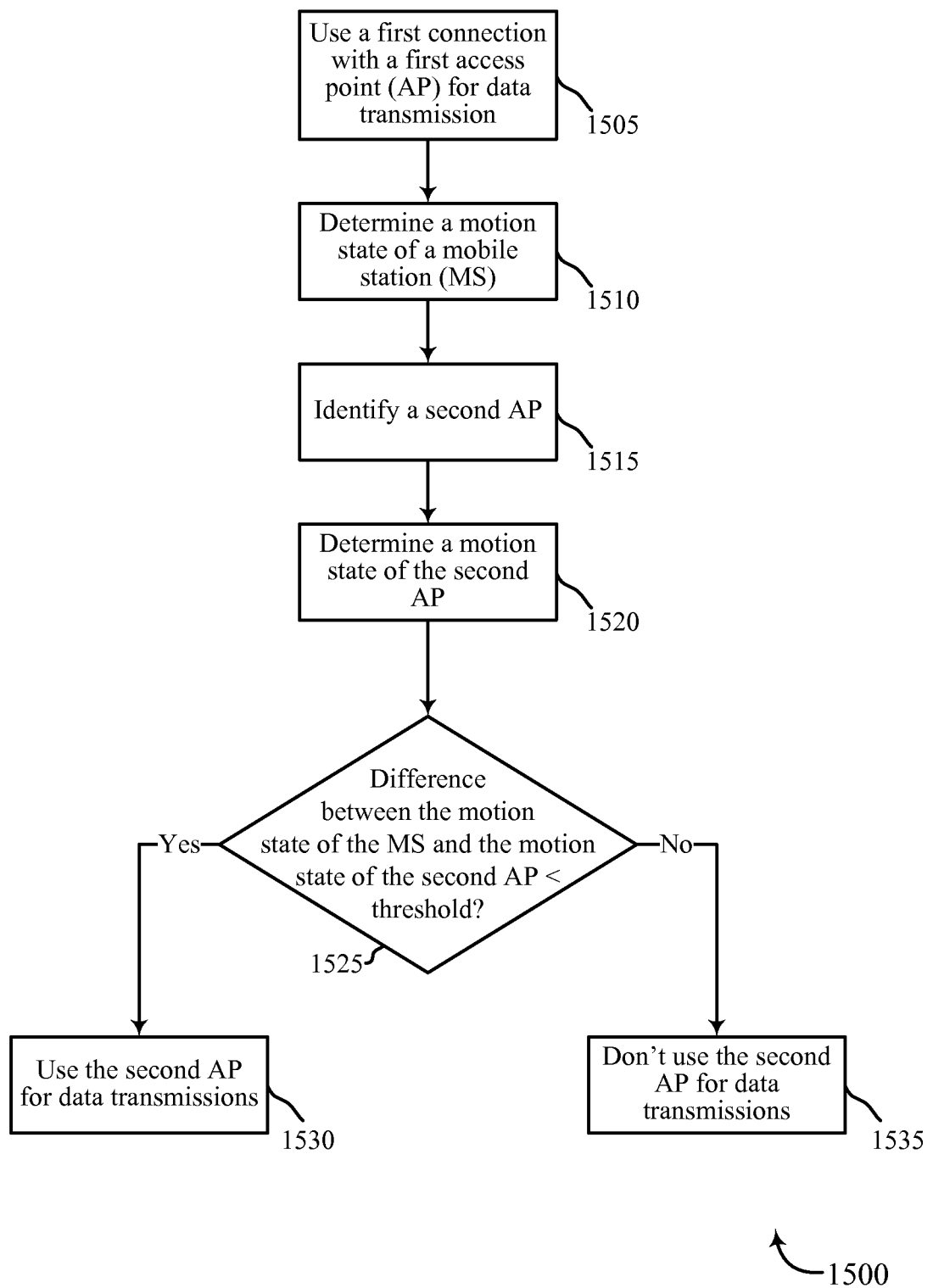

FIG. 15 is a flow chart illustrating another method 1500 for avoiding bad connections. For clarity, the method 1500 is described below with reference to one of the MSs 115 described with reference to FIGS. 1, 2, 3, 4, 7, 8, 9, 10, 11, 12, and/or 13. In one implementation, the MS connection management module 210 described with reference to FIGS. 2, 3, 4, and/or 11 may execute one or more sets of codes to control the functional elements of a MS 115 to perform the functions described below.

At block 1505, a first connection with a first AP may be used for data transmissions.

At block 1510, a motion state of an MS may be determined.

At block 1515, a second AP may be identified.

At block 1520, a motion state of the second AP may be determined. In some cases, the motion state of the second AP may be learned based on at least one previous connection with the second AP. For example, the motion state of the AP may be learned based on the duration of the previous connection with the AP and the motion state of the MS throughout the previous connection with the AP. In some embodiments, the motion state of the second AP may be determined using the motion state determination module 305 described with reference to FIGS. 3 and/or 4.

At block 1525, a determination may be made as to whether the difference between the motion state of the MS and the motion state of the second AP satisfies a threshold. In one example, the threshold may require that the motion state of the MS is the same as the motion state of the AP. In another example, the threshold may be a relative difference between the motion state of the MS and the motion state of the AP. If the difference between the motion state of the MS and the motion state of the AP satisfies the threshold, then, at block 1530, the second AP may be used for data transmissions. If, however, the difference between the motion state of the MS and the motion state of the AP does not satisfy the threshold, then, at block 1535, the second AP may not be used for data transmissions. In some embodiments, the operation(s) at blocks 1525, 1530, and 1535, may be performed by the connection usage module 310 described with reference to FIGS. 3 and/or 4.

Therefore, the method 1500 may be used for avoiding bad connections. It should be noted that the method 1500 is just one implementation and that the operations of the method 1500 may be rearranged or otherwise modified such that other implementations are possible.

Figure 16:
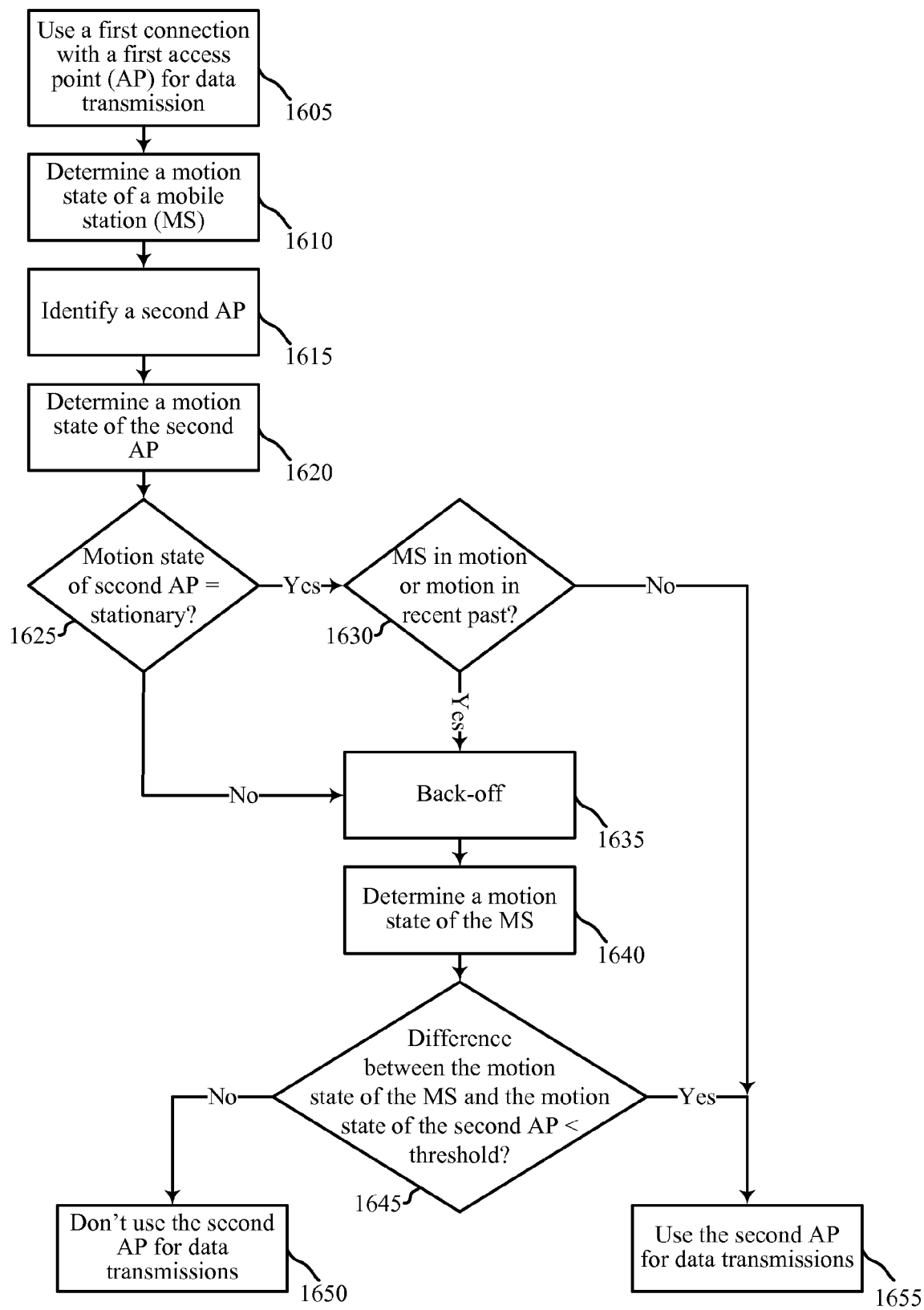

FIG. 16 is a flow chart illustrating yet another method 1600 for avoiding bad connections. For clarity, the method 1600 is described below with reference to one of the MSs 115 described with reference to FIGS. 1, 2, 3, 4, 7, 8, 9, 10, 11, 12, and/or 13. In one implementation, the MS connection management module 210 described with reference to FIGS. 2, 3, 4, and/or 13 may execute one or more sets of codes to control the functional elements of a MS 115 to perform the functions described below.

At block 1605, a first connection with a first AP may be used for data transmissions.

At block 1610, a motion state of an MS may be determined.

At block 1615, a second AP may be identified.

At block 1620, a motion state of the second AP may be determined.

At block 1625, a determination may be made as to whether the motion state of the second AP is stationary. If the motion state of the second AP is not stationary (e.g., moving), then at block 1615, a back-off timer may be started. If, however, the motion state of the second AP is stationary, then at block 1630, a determination may be made as to whether the MS is in motion or was in motion in the recent past. If the MS is not in motion or was not in motion in the recent past, then at block 1655, the second AP may be used for data transmissions. If, however, the MS is in motion or was in motion in the recent past, then, at block 1635, a back-off timer may be started. In some cases, further operations may be delayed until the expiration of the back-off timer. In one example, the duration of the back-off timer may depend on past movement of the MS and/or the specifically identified AP. Upon expiration of the back-off timer, at block 1640, the motion state of the MS may be determined again.

At block 1645, a determination may be made as to whether the difference between the motion state of the MS and the motion state of the second AP satisfies a threshold. If the difference between the motion state of the MS and the motion state of the AP satisfies the threshold, then, at block 1655, the second AP may be used for data transmissions. If, however, the difference between the motion state of the MS and the motion state of the AP does not satisfy the threshold, then, at block 1650, the second AP may not be used for data transmissions. In some embodiments, the operation(s) at blocks 1625, 1630, and 1640 may be performed by the motion state determination module 305 described with reference to FIGS. 3 and/or 4, and the operation(s) at blocks 1645, 1655, 1650, and 1635, may be performed by the connection usage module 310 described with reference to FIGS. 3 and/or 4.

Therefore, the method 1600 may be used for avoiding bad connections. It should be noted that the method 1600 is just one implementation and that the operations of the method 1600 may be rearranged or otherwise modified such that other implementations are possible.

Figure 17:
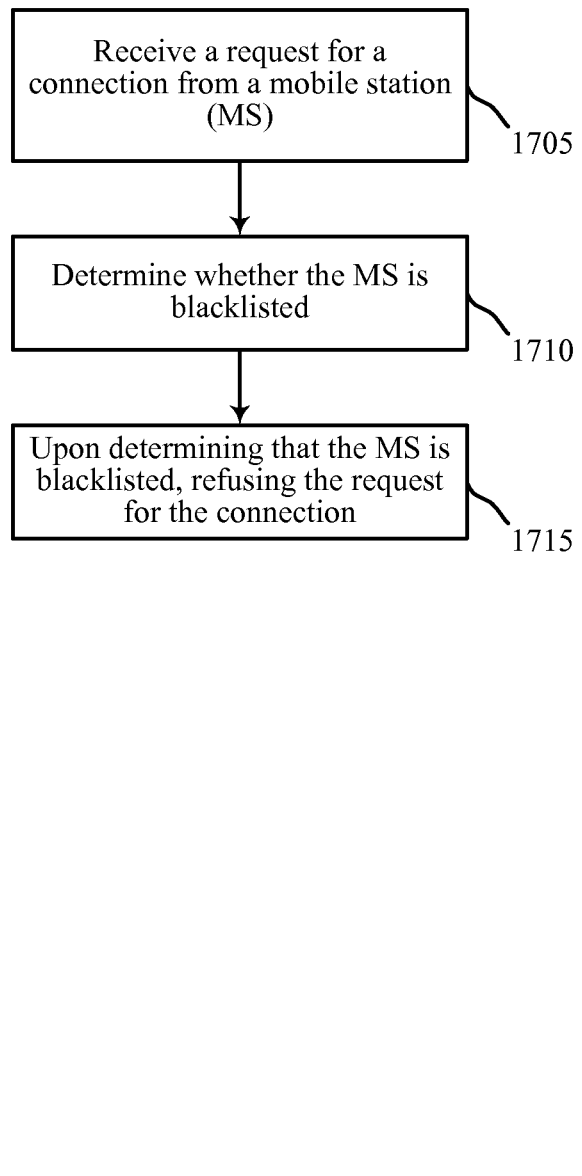

FIG. 17 is a flow chart illustrating another method 1700 for managing interfaces for wireless communications. For clarity, the method 1700 is described below with reference to one of the APs 105 described with reference to FIGS. 1, 5, 6, 7, 8, 9, 10, 11, 12, and/or 13. In one implementation, the AP connection management module 510 described with reference to FIGS. 5, 6, and/or 13 may execute one or more sets of codes to control the functional elements of an AP 105 to perform the functions described below.

At block 1705, a request for a connection from a MS may be received.

At block 1710, a determination may be made as to whether the MS is blacklisted. In some embodiments, the determination as to whether the MS is blacklisted may be made using the blocking module 615 described with reference to FIG. 6.

At block 1715, upon determining that the MS is blacklisted, the request for the connection may be refused. In one example, the request for the connection may be ignored. In some embodiments, the request may be refused by the blocking module 615 described with reference to FIG. 6.

Therefore, the method 1700 may be used for avoiding bad connections. It should be noted that the method 1700 is just one implementation and that the operations of the method 1700 may be rearranged or otherwise modified such that other implementations are possible.

Figure 18:
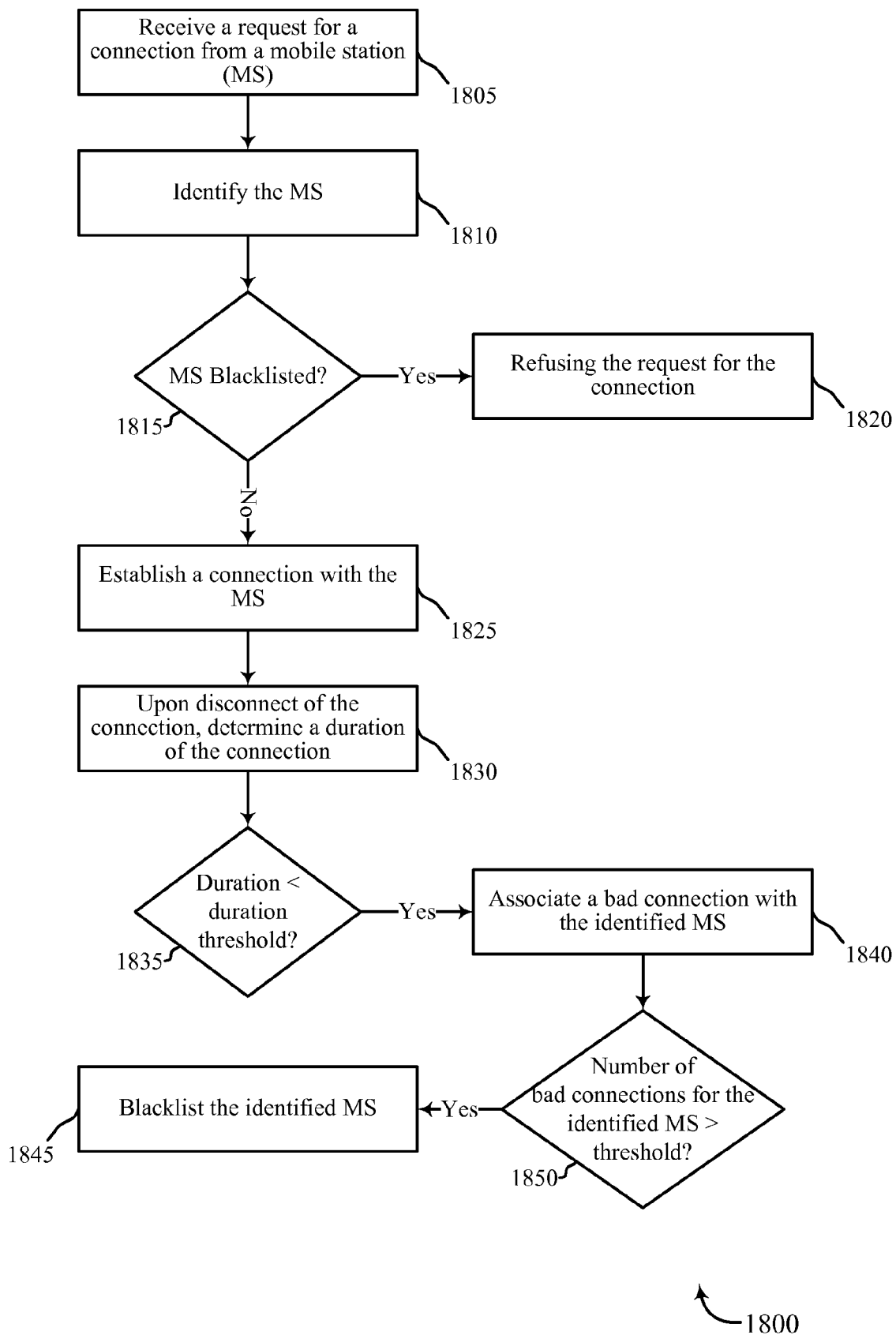

FIG. 18 is a flow chart illustrating yet another method 1800 for avoiding bad connections. For clarity, the method 1800 is described below with reference to one of the APs 105 described with reference to FIGS. 1, 5, 6, 7, 8, 9, 10, 11, 12, and/or 13. In one implementation, the AP connection management module 510 described with reference to FIGS. 5, 6, and/or 13 may execute one or more sets of codes to control the functional elements of a MS 115 to perform the functions described below.

At block 1805, a request for a connection from a MS may be received.

At block 1810, the MS may be identified. For example, the MS may be identified based on the contents of the request for the connection received from the MS.

At block 1815, a determination may be made as to whether the MS is blacklisted. If the MS is determined to be blacklisted, then at block 1820, the request for the connection may be refused. If, however, the MS is determined to not be blacklisted, then at block 1825, a connection with the MS may be established. In some cases, the AP may monitor the connection with the MS.

At block 1830, upon the connection being disconnected, a duration of the connection may be determined. In some embodiments, the connection may be monitored and the duration of the connection may be determined using the connection monitoring module 605 described with reference to FIG. 6.

At block 1835, a determination may be made as to whether the duration is less than a threshold. In some cases, the threshold may be set avoid connections when the duration of the connection may be too short for the connection to be beneficial connection for the MS.

At block 1840, a bad connection may be associated with the identified MS. For example a number of bad connections along with a time stamp for each bad connection may be associated with the identified MS.

At block 1850, a determination may be made as to whether the number of bad connection for the identified MS within a period of time is greater than a threshold. In one example, the threshold may be based on a number of bad connections within a period of time (e.g., the last 48 hours). For instance, the threshold may be a top percentage of MSs based on a number of bad connections within a most recent period of time. Accordingly, the specific MSs that are blacklisted may dynamically change depending on the number of bad connections associated with other MSs. If the number of bad connections within the period of time is greater than the threshold, then, at block 1845, the identified MS may be blacklisted. Although the blacklisting is illustrated as being dependent upon disconnection of a connection with the AP, it is understood that a MS may be blacklisted or unblacklisted without any interaction with the AP. For instance, a change in the number of bad connections associated with other MSs may result in an AP being blacklisted or unblacklisted.

Therefore, the method 1800 may be used for avoiding bad connections. It should be noted that the method 1800 is just one implementation and that the operations of the method 1800 may be rearranged or otherwise modified such that other implementations are possible.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing data transmissions, comprising:
   using a first connection with a first access point for data transmissions;
   determining a motion state of a mobile device based on sensor data from at least one sensor within the mobile device;
   upon detecting a second access point, determining a motion state of the second access point, wherein the motion state of the second access point is determined based at least in part on a previous connection with the second access point; and
   determining whether to use the second access point for data transmissions based at least in part on the determined motion state of the mobile device and the determined motion state of the second access point.

2. The method of claim 1, wherein determining the motion state of the mobile device comprises:
   determining the motion state based on an acceleration of movement of the mobile device.

3. The method of claim 1, wherein determining the motion state of the mobile device comprises:
   determining the motion state based on an angular rotational velocity of the mobile device.

4. The method of claim 1, wherein determining whether to use the second access point for data transmissions based at least in part on the determined motion state of the mobile device and the determined motion state of the second access point comprises:
   determining to use the second access point when the determined motion state of the mobile device and the determined motion state of the second access point are the same.

5. The method of claim 1, wherein determining whether to use the second access point for data transmissions based at least in part on the determined motion state of the mobile device and the determined motion state of the second access point comprises:
   determining to use the second access point when a relative difference between the determined motion state of the mobile device and the determined motion state of the second access point is within a threshold.

6. The method of claim 1, wherein determining the motion state of the second access point comprises:
   learning the motion state of the second access point based at least in part on a previous connection with the second access point.

7. The method of claim 1, wherein determining the motion state of the second access point comprises:
   crowd sourcing information about the second access point, the information comprising the motion state of the second access point.

8. The method of claim 1, wherein determining whether to use the second access point for data transmissions comprises:
   determining whether a back-off timer has been satisfied.

9. The method of claim 8, further comprising:
   adjusting a duration of the back-off timer based at least in part on a previous connection with the second access point.

10. The method of claim 8, wherein the duration of the back-off timer is access point specific.

11. The method of claim 1, wherein determining whether to use the second access point comprises:
   determining whether to establish a connection with the second access point.

12. The method of claim 1, wherein determining whether to use the second access point comprises:
   determining whether to switch the data transmissions to an established connection with the second access point.

13. The method of claim 1, further comprising:
   associating the determined motion state of the mobile device with the detected second access point; and
   storing information about the detected second access point and its associated motion state.

14. The method of claim 1, wherein the first access point comprises a macro cell access point and the second access point comprises a small cell access point.

15. The method of claim 1, wherein the at least one sensor comprises at least one of an accelerometer and a gyroscope.

16. An apparatus for managing data transmissions, comprising:
means for using a first connection with a first access point for data transmissions;
means for determining a motion state of a mobile device based on sensor data from at least one sensor within the mobile device;
means for determining a motion state of a second access point upon detecting the second access point, wherein the motion state of the second access point is determined based at least in part on a previous connection with the second access point; and
means for determining whether to use the second access point for data transmissions based at least in part on the determined motion state of the mobile device and the determined motion state of the second access point.

17. The apparatus of claim 16, wherein the means for determining the motion state of the mobile device determines the motion state based on an acceleration of movement of the mobile device.

18. The apparatus of claim 16, wherein the means for determining the motion state of the mobile device determines the motion state based on an angular rotational velocity of the mobile device.

19. An apparatus for managing data transmissions, comprising:
a processor;
a memory in electronic communications with the processor, the memory embodying instructions, the instructions being executable by the processor to:
use a first connection with a first access point for data transmissions;
determine a motion state of a mobile device based on sensor data from at least one sensor within the mobile device;
determine a motion state of a second access point upon detecting the second access point, wherein the motion state of the second access point is determined based at least in part on a previous connection with the second access point; and
determine whether to use the second access point for data transmissions based at least in part on the determined motion state of the mobile device and the determined motion state of the second access point.

20. The apparatus of claim 19, wherein the instructions to determine the motion state of the mobile device are executable by the processor to:
determine the motion state based on an acceleration of movement of the mobile device.

21. The apparatus of claim 19, wherein the instructions to determine the motion state of the mobile device are executable by the processor to:
determine the motion state based on an angular rotational velocity of the mobile device.

22. A non-transitory computer-readable medium storing instructions executable by a processor to:
use a first connection with a first access point for data transmissions;
determine a motion state of a mobile device based on sensor data from at least one sensor within the mobile device;
determine a motion state of a second access point upon detecting the second access point, wherein the motion state of the second access point is determined based at least in part on a previous connection with the second access point; and
determine whether to use the second access point for data transmissions based at least in part on the determined motion state of the mobile device and the determined motion state of the second access point.

23. The non-transitory computer-readable medium of claim 22, wherein the instructions to determine the motion state of the mobile device are executable by the processor to:
determine the motion state based on an acceleration of movement of the mobile device.

24. The non-transitory computer-readable medium of claim 22, wherein the instructions to determine the motion state of the mobile device are executable by the processor to:
determine the motion state based on an angular rotational velocity of the mobile device.

25. A method for managing connections, comprising:
receiving a request for a connection from a mobile device;
determining, at an access point, whether the mobile device is blacklisted, wherein the mobile device is blacklisted when a number of previous bad connections associated with the mobile device exceeds a threshold, a previous bad connection comprising a connection having a duration that fails to satisfy a time threshold; and
upon determining that the mobile device is blacklisted, refusing the request for the connection from the mobile device.

26. The method of claim 25, wherein a previous connection comprises a connection that is disconnected due to the mobile device leaving a coverage area of the access point.

27. The method of claim 25, wherein the mobile device is blacklisted when the number of previous bad connections within a time period exceeds a threshold.

28. The method of claim 25, further comprising:
upon determining that the mobile device is not blacklisted, establishing a connection with the mobile device.

29. The method of claim 28, further comprising:
identifying the mobile device;
determining a duration of the connection with the mobile device;
identifying the connection as a previous bad connection when the duration of the connection fails to satisfy a threshold;
identifying a time of the previous bad connection; and
associating the previous bad connection with the identified mobile device.

30. The method of claim 25, wherein the access point comprises a small cell access point.

31. An apparatus for managing connections, comprising:
means for receiving a request for a connection from a mobile device;
means for determining, at an access point, whether the mobile device is blacklisted, wherein the mobile device is blacklisted when a number of previous bad connections associated with the mobile device exceeds a threshold, a previous bad connection comprising a connection having a duration that fails to satisfy a time threshold; and
means for refusing the request for the connection from the mobile device, upon determining that the mobile device is blacklisted.

32. The apparatus of claim 31, wherein a previous connection comprises a connection that is disconnected due to the mobile device leaving a coverage area of the access point.

33. An apparatus for managing connections, comprising:
a processor; and
a memory in electronic communication with the processor, the memory embodying instructions, the instructions being executable by the processor to:
receive a request for a connection from a mobile device;
determine, at an access point, whether the mobile device is blacklisted, wherein the mobile device is blacklisted when a number of previous bad connections associated with the mobile device exceeds a threshold, a previous bad connection comprising a connection having a duration that fails to satisfy a time threshold; and
upon determining that the mobile device is blacklisted, refuse the request for the connection from the mobile device.

34. The apparatus of claim 33, wherein a previous bad connection comprises a connection that is disconnected due to the mobile device leaving a coverage area of the access point.

35. A non-transitory computer-readable medium storing instructions executable by a processor to:
receive a request for a connection from a mobile device;
determine, at an access point, whether the mobile device is blacklisted, wherein the mobile device is blacklisted when a number of previous bad connections associated with the mobile device exceeds a threshold, a previous bad connection comprising a connection having a duration that fails to satisfy a time threshold; and
upon determining that the mobile device is blacklisted, refuse the request for the connection from the mobile device.

36. The non-transitory computer-readable medium of claim 35, wherein a previous bad connection comprises a connection that is disconnected due to the mobile device leaving a coverage area of the access point.

\* \* \* \* \*